United States Patent
Suzuki et al.

(10) Patent No.: US 12,440,892 B2
(45) Date of Patent: Oct. 14, 2025

(54) SOFT MAGNETIC ALLOY POWDER, SOFT MAGNETIC SINTERED BODY, AND COIL-TYPE ELECTRONIC COMPONENT

(71) Applicant: TDK CORPORATION, Tokyo (JP)

(72) Inventors: Takashi Suzuki, Tokyo (JP); Yu Sakurai, Tokyo (JP); Hideyuki Itoh, Tokyo (JP); Kouichi Kakuda, Tokyo (JP); Ryuichi Wada, Tokyo (JP); Nami Enomoto, Tokyo (JP); Yusuke Nagai, Tokyo (JP); Kunihiko Kawasaki, Tokyo (JP); Shinichi Kondo, Tokyo (JP); Yuya Ishima, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/760,951

(22) PCT Filed: Sep. 25, 2020

(86) PCT No.: PCT/JP2020/036308
§ 371 (c)(1),
(2) Date: Mar. 16, 2022

(87) PCT Pub. No.: WO2021/060479
PCT Pub. Date: Apr. 1, 2021

(65) Prior Publication Data
US 2022/0336128 A1    Oct. 20, 2022

(30) Foreign Application Priority Data

Sep. 26, 2019    (JP) .................... 2019-176206

(51) Int. Cl.
*B22F 3/00* (2021.01)
*B22F 1/05* (2022.01)
(Continued)

(52) U.S. Cl.
CPC .............. *B22F 3/00* (2013.01); *B22F 1/05* (2022.01); *B22F 1/10* (2022.01); *B22F 1/16* (2022.01);
(Continued)

(58) Field of Classification Search
None
See application file for complete search history.

(56) References Cited

U.S. PATENT DOCUMENTS

2008/0100410 A1    5/2008    Tomita et al.
2010/0097171 A1 *  4/2010    Urata ................ C22C 38/002
                                              420/83

(Continued)

FOREIGN PATENT DOCUMENTS

CN    106158219 A  * 11/2016
CN    107275030 A    10/2017
(Continued)

OTHER PUBLICATIONS

Mar. 15, 2022 International Preliminary Report on Patentability issued in International Patent Application No. PCT/JP2020/036308.
(Continued)

*Primary Examiner* — Xiaobei Wang
(74) *Attorney, Agent, or Firm* — Oliff PLC

(57) ABSTRACT

A soft magnetic metal powder or the like from which a soft magnetic metal fired body can be provided has a high magnetic permeability μ and a specific resistance ρ and is contained in a coil-type electronic component having sufficiently high inductance L and Q value and unlikely to be plating-extended and short-circuited. A soft magnetic metal powder contains soft magnetic metal particles containing at least Fe and Ni. Said soft magnetic metal powder further contains P, Si, Cr and/or M. M is at least one selected from among B, Co, Mn, Ti, Zr, Hf, Nb, Ta, Mo, Mg, Ca, Sr, Ba, (Continued)

Zn, Al, and rare earth elements. The content of each element is within a predetermined range.

12 Claims, 6 Drawing Sheets

(51) Int. Cl.
  *B22F 1/10* (2022.01)
  *B22F 1/16* (2022.01)
  *C22C 19/03* (2006.01)
  *C22C 19/05* (2006.01)
  *C22C 30/00* (2006.01)
  *C22C 38/08* (2006.01)
  *H01F 1/147* (2006.01)
  *H01F 27/28* (2006.01)

(52) U.S. Cl.
  CPC ........... *C22C 30/00* (2013.01); *H01F 1/1475* (2013.01); *B22F 2304/10* (2013.01); *C22C 19/03* (2013.01); *C22C 19/057* (2013.01); *C22C 38/08* (2013.01); *C22C 2202/02* (2013.01); *H01F 27/28* (2013.01)

(56) References Cited

U.S. PATENT DOCUMENTS

| | | |
|---|---|---|
| 2012/0274438 A1 | 11/2012 | Hachiya et al. |
| 2019/0198210 A1 | 6/2019 | Suzuki et al. |
| 2019/0198211 A1 | 6/2019 | Kwon et al. |
| 2019/0279801 A1* | 9/2019 | Yoshidome ............... H01F 1/38 |
| 2021/0060642 A1* | 3/2021 | Tanoue ............... C22C 33/0228 |

FOREIGN PATENT DOCUMENTS

| | | | |
|---|---|---|---|
| CN | 107578874 A | * | 1/2018 |
| CN | 109732078 A | * | 5/2019 |
| CN | 109979700 A | | 7/2019 |
| JP | S58-054185 B2 | | 12/1983 |
| JP | 2008-135674 A | | 6/2008 |
| JP | 2012-238840 A | | 12/2012 |
| JP | 2017-101311 A | | 6/2017 |
| JP | 2019-117921 A | | 7/2019 |
| JP | 2020094272 A | * | 6/2020 |

OTHER PUBLICATIONS

Jul. 31, 2024 Office Action issued in Chinese Patent Application No. 202080066068.3.
King, Handbook of Devices for Practical Electron Transformer Materials, Liao ning Science Press, pp. 142-143, May 2003.
Chen, Electrotechnical Equipment, Beijing: China Railway Press, pp. 177-178, Apr. 1985.

* cited by examiner

SOFT MAGNETIC ALLOY POWDER, SOFT MAGNETIC SINTERED BODY, AND COIL-TYPE ELECTRONIC COMPONENT

TECHNICAL FIELD

The present invention relates to a soft magnetic metal powder, a soft magnetic metal sintered body, and a coil type electronic component.

BACKGROUND

Patent Document 1 discloses an invention relating to a multilayer coil, and it discloses that a resin is impregnated to fill a space between Fe—Si—Cr alloy particles.

Patent Document 2 discloses an invention relating to a soft magnetic alloy powder, and it includes Fe—Ni based particles of which amounts of Fe, Ni, Co, and Si are respectively regulated within predetermined ranges.

[Patent Document 1] JP Patent Application Laid Open No. 2012-238840

[Patent Document 2] JP Patent Application Laid Open No. 2008-135674

SUMMARY

The object of the present disclosure is to provide a soft magnetic metal powder capable of providing a soft magnetic metal sintered body having high permeability μ and specific resistance ρ included in a coil type electronic component which has sufficiently high inductance L and Q value while rarely causing a plating elongation and a short circuit.

A soft magnetic metal powder according to the first aspect of the present disclosure is a soft magnetic metal powder including soft magnetic metal particles each constituted by a Fe—Ni—Si-M based alloy, wherein
the Fe—Ni—Si-M based alloy further includes P;
M is one or more selected from B, Co, Mn, Ti, Zr, Hf, Nb, Ta, Mo, Mg, Ca, Sr, Ba, Zn, Al, and rare earth elements; and
the Fe—Ni—Si-M based alloy includes 15.0 mass % or more and 55.0 mass % or less of Ni, 2.0 mass % or more and 6.0 mass % or less of Si, 2.0 mass % or more and 40.0 mass % or less of M, and 100 ppm or more and 5000 ppm or less of P with respect to 100 mass % of a total amount of Fe, Ni, Si, and M.

A soft magnetic metal powder according to a second aspect of the present disclosure is a soft magnetic metal powder including soft magnetic metal particles each constituted by a Fe—Ni based alloy, wherein
the Fe—Ni based alloy further includes Cr;
the Fe—Ni based alloy further includes Si and/or M;
M is one or more selected from B, Co, Mn, Ti, Zr, Hf, Nb, Ta, Mo, Mg, Ca, Sr, Ba, Zn, Al, and rare earth elements; and
the Fe—Ni based alloy includes less than 2.0 mass % of Cr with respect to 100 mass % of a total amount of Fe, Ni, Si, M, and Cr.

The Fe—Ni based alloy may further include P; and
the Fe—Ni based alloy may include 100 ppm or more and 5000 ppm or less of P with respect to 100 mass % of a total amount of Fe, Ni, Si, M, and Cr Common characteristics between the soft magnetic alloy powder according to the first aspect and the soft magnetic alloy powder according to the second aspect of the present disclosure are described in below.

M may be Co.

An average particle size (D50) of the soft magnetic metal powder may be 1.5 μm or more and 15.0 μm or less.

A soft magnetic sintered body according to the first aspect and second aspect of the present disclosure includes the soft magnetic metal powder according to the first aspect and the second aspect of the present disclosure.

The soft magnetic metal sintered body including the above-mentioned soft magnetic metal powder tends to attain high permeability μ and specific resistance ρ.

A coil type electronic component according to the first aspect and the second aspect of the present disclosure includes a magnetic element and a coil conductor embedded in the magnetic element, wherein
the magnetic element includes the soft magnetic metal sintered body according to the first aspect and second aspect of the present disclosure.

The coil type electronic component in which the magnetic element is constituted by the above-mentioned soft magnetic sintered body has sufficiently high inductance L and Q value while rarely causing a plating elongation and a short circuit.

The soft magnetic metal particles may be each covered with a coating film, and
the coating film may have a layer including Si or oxides of Si contacting the soft magnetic particle.

The layer of the coating film contacting the soft magnetic metal particle may further include P.

An average thickness of the coating film may be within a range of 5 nm or more and 60 nm or less.

A coil type electronic component according to a third aspect of the present disclosure includes a magnetic element and a coil conductor embedded in the magnetic element, wherein
the magnetic element includes soft magnetic metal particles;
an amount of Cr in each of the soft magnetic metal particles is less than 2.0 mass % (not including 0 mass %);
the soft magnetic metal particles are each covered with a coating film,
the coating film includes a first layer contacting the soft magnetic metal particle and a second layer contacting the first layer;
the first layer includes Si or oxides including Si; and
the second layer includes Cr.

An average thickness (D1) of the first layer and an average thickness (D2) of the second layer may satisfy $0.5 \leq D2/D1 \leq 1.5$.

D2 may be 2.5 nm or more and 30 nm or less

Described in below are common characteristics in the coil type electronic component described in above.

The magnetic element may include the soft magnetic metal particles and a resin; and
a space formed between the soft magnetic metal particles may be filled with the resin.

The resin may be a phenol resin or an epoxy resin.

DETAILED DESCRIPTION

Figure 1:
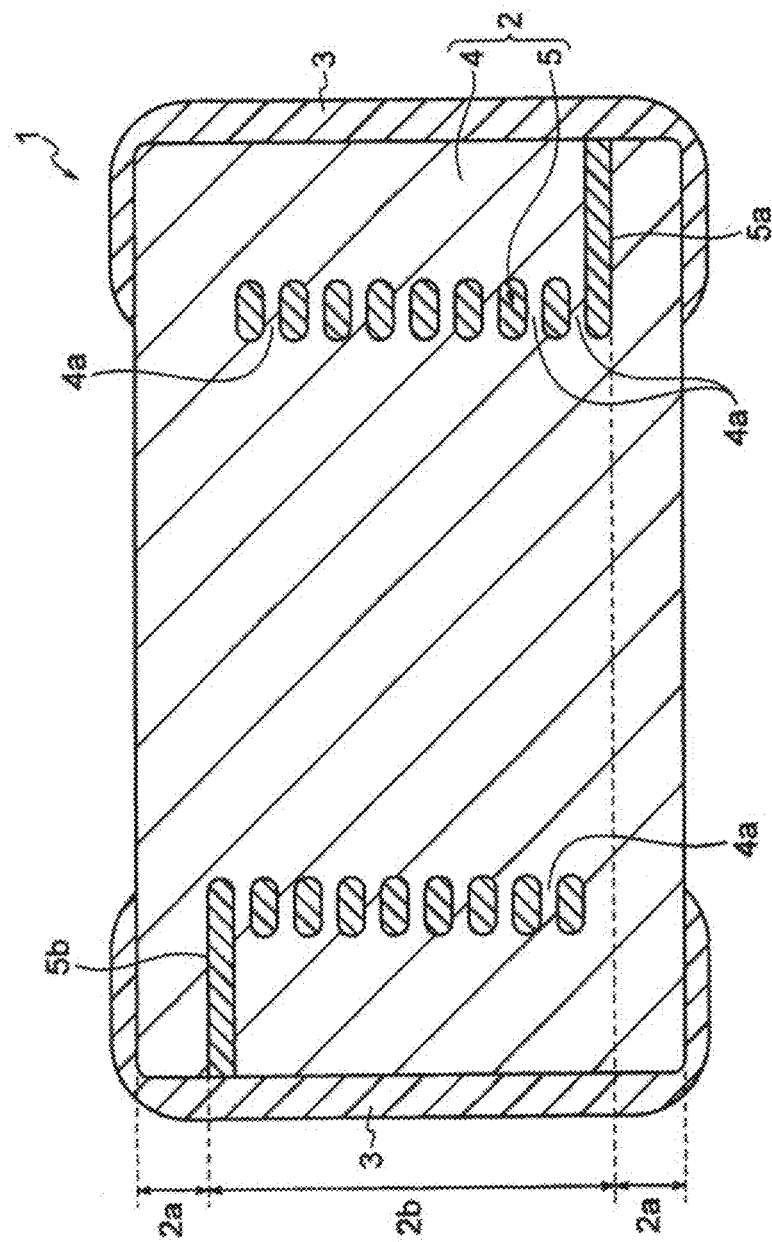
FIG. 1 is a multilayer coil according to an embodiment of the present disclosure.

Hereinafter, the present disclosure is described based on embodiments shown in the figures.
<Soft Magnetic Metal Powder>

First Embodiment

A soft magnetic metal powder according to the first embodiment includes a plurality of soft magnetic metal particles. The soft magnetic metal particles are each constituted by a Fe—Ni—Si-M based alloy. The Fe—Ni—Si-M based alloy further includes P. M is one or more selected from B, Co, Mn, Ti, Zr, Hf, Nb, Ta, Mo, Mg, Ca, Sr, Ba, Zn, Al, and rare earth elements. M may preferably be Co. In the Fe—Ni—Si-M based alloy of the present embodiment, when a total amount of Fe, Ni, Si, and M is 100 mass %, an amount of other elements excluding P and O may be 0.15 mass % or less. An amount of O may be 0.5 mass % or less. An amount of Cr may be less than 0.1 mass %, and may be 0.03 mass % or less.

Further, an amount of Ni is within a range of 15.0 mass % or more and 55.0 mass % or less, an amount of Si is within a range of 2.0 mass % or more and 6.0 mass % or less, and an amount of M is within a range of 2.0 mass % or more and 40.0 mass % or less. Further, an amount of P is within a range of 100 ppm or more and 5000 ppm or less, that is the amount of P is within a range of 0.0100 mass % or more and 0.5000 mass % or less.

The amount of Ni may be within a range of 22.0 mass % or more and 42.0 mass % or less. The amount of Si may be within a range of 2.5 mass % or more and 5.5 mass % or less, or it may be within a range of 2.5 mass % or more and 4.0 mass % or less. The amount of M may be within a range of 5.0 mass % or more and 32.0 mass % or less. The amount of P may be within a range of 300 ppm or more and 2000 ppm or less.

By producing the soft magnetic metal sintered body using the soft magnetic metal powder constituted by the soft magnetic metal particles satisfying the above composition, the soft magnetic metal sintered body having higher permeability μ and specific resistance ρ can be obtained compared to the case of producing a soft magnetic metal sintered body using a soft magnetic metal powder constituted by soft magnetic metal particles which do not satisfy the above composition.

Particularly, when the amount of Si is too small, the specific resistance tends to decrease. This is because an oxidation state of the soft magnetic metal particles after heat treatment is difficult to maintain in an appropriate state.

The average particle size (D50) of the soft magnetic metal powder according to the present embodiment may be within a range of 1.5 μm or more and 15.0 μm or less, may be within a range of 2.0 μm or more and 15.0 μm or less, or may be within a range of 5.0 μm or more and 10.0 μm or less. By making the average particle size of the soft magnetic metal powder within the above-mentioned range, the soft magnetic metal sintered body having high permeability μ and specific resistance ρ tends to be obtained easily. A method of measuring the average particle size (D50) is not particularly limited. For example, a laser diffraction scattering method may be used. Note that, the soft magnetic metal particles constituting the soft magnetic metal powder may be in any shape.

<Soft Magnetic Metal Sintered Body>

The plurality of soft magnetic metal particles is connected with each other after sintering, and forms the soft magnetic sintered body according to the present embodiment. Specifically, elements included in the plurality of soft magnetic metal particles react with other elements (such as O) due to sintering, and the plurality of soft magnetic metal particles are connected via bonding formed by said reaction. In the soft magnetic metal sintered body according to the present embodiment, the soft magnetic metal particles of the soft magnetic powder are connected due to a heat treatment, however each soft magnetic metal particle barely undergoes grain growth. That is, the particle size of each soft magnetic metal particle barely changes.

Note that, regarding the particle size of the soft magnetic metal particle included in the soft magnetic metal sintered body, an image analysis of a cross section of the soft magnetic metal sintered body may be performed using SEM, STEM, and the like to calculate an area of the soft magnetic metal particle. Then, the particle size may be calculated as a diameter of a circle equivalent (circle equivalent diameter) to said area.

The particle size and the composition of the soft magnetic metal particle included in the soft magnetic metal sintered body are the same as the composition of the above-mentioned soft magnetic metal powder except for the amount of O. The amount of O may be 0.5 mass % or less.

<Coil Type Electronic Component>

The coil type electronic component according to the present embodiment may be a multilayer coil type electronic component. The coil type electronic component according to the present embodiment may for example be the multilayer coil shown in FIG. 1.

As shown in FIG. 1, a multilayer coil 1 according to the present embodiment includes an element body 2 and a terminal electrode 3. In the element body 2, a coil conductor 5 is embedded three dimensionally and spirally in a magnetic element 4. The terminal electrode 3 is formed to both ends of the element body 2, and the terminal electrode 3 is connected to the coil conductor 5 via lead electrodes 5a and 5b. Also, the element body 2 is constituted form a middle part 2b where the coil conductor 5 is embedded, and a surface part 2a where the coil conductor 5 is not embedded which is at bottom and top in a stacking direction (z-axis direction) of the middle part 2b. Also, in the present embodiment, a space formed between the winding coil conductor 5 in a stacking direction is defined as a conductor interspace 4a.

A shape of the element body 2 is not particular limited, and usually it is a rectangular parallelepiped shape. Also, the size of the element body 2 is not particularly limited, and it may be appropriate size depending on the use. For example, the size may be 0.2 to 2.5 mm×0.1 to 2.0 mm×0.1 to 1.2 mm.

A material of the terminal electrode 3 is not particularly limited as long as it is an electrical conductor. For example, Ag, Cu, Au, Al, Ag alloy, Cu alloy, and the like may be used. Particularly, Ag is preferably used because of a low cost and a low resistance. The terminal electrode 3 may include glass frit. Also, the terminal electrode 3 may be a two-layer structure, which is a metal layer formed on the element body 2 and constituted by the above-mentioned metals or by constituted by the glass frit and the above-mentioned metals, and a resin layer made of a conductive resin which is formed on the metal layer. A type of metal included in the conductive resin is not particular limited. For example, Ag may be mentioned. Also, a surface of the terminal electrode 3 may be plated. For example, Cu plating, Ni plating, and/or Sn plating may be performed accordingly.

A material of the coil conductor 5 and lead electrodes 5a and 5b is not particularly limited as long as it is electrical conductor. For example, Ag, Cu, Au, Al, Ag alloy, Cu alloy, and the like may be used. Particularly, Ag is preferably used because of a low cost and a low resistance.

Figure 2:
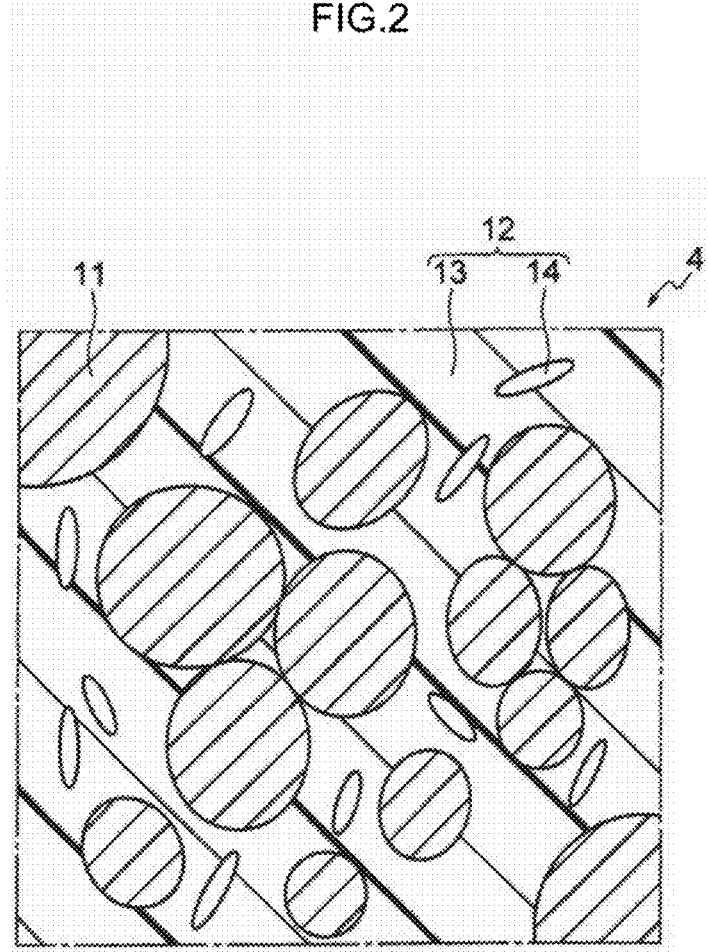
FIG. 2 is a schematic diagram of a cross section of a magnetic element.

The magnetic element 4 may be constituted by the soft magnetic metal particles 11 and a resin 13 as shown in FIG. 2. By having the resin 13, the inductance L and the Q value can increase easily. Moreover, a short circuit rarely occurs in the multilayer coil. FIG. 2 is a schematic diagram of a cross section of the magnetic element 4. Also, an area other than the soft magnetic metal particles 11 in the magnetic element 4 is defined as a space 12. The space 12 is filled with the resin 13, and an area where the resin is not filled is a void 14. Also, before the resin is filled into the space 12, the entire space 12 is the void 14.

Figure 13:
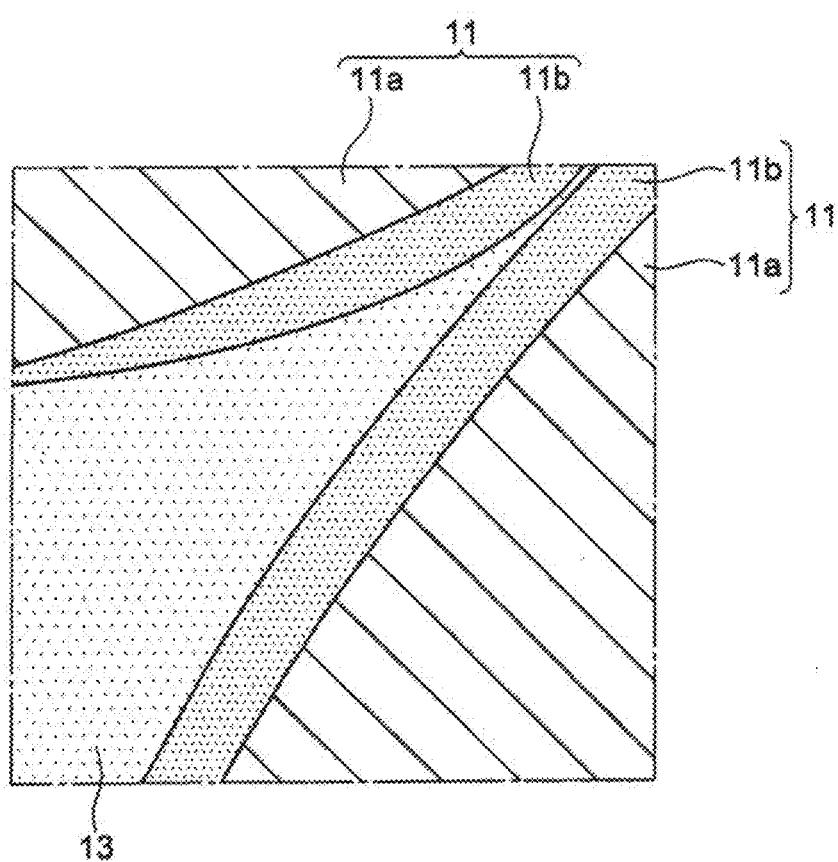
FIG. 13 is a schematic image of a cross section of one of soft magnetic metal particles in a magnetic element.

The soft magnetic metal particle 11 may be covered with a coating film. Specifically, as shown in FIG. 13, the soft magnetic metal particle 11 may be constituted by a soft magnetic metal particle core 11a and an oxide coating film 11b covering the soft magnetic metal particle core 11a. Further, the oxide coating film 11b covering the soft magnetic metal particle core 11a according to the present embodiment preferably includes a layer made of oxides including Si, and the soft magnetic metal particle core 11a preferably is in contact with the layer made of oxides including Si. As the oxide coating film 11b covering the soft magnetic metal particle core 11a includes the layer made of oxides including Si, an insulation property between the soft magnetic metal particles 11 increase and the Q value improves. Also, as the oxide coating film covering the soft magnetic metal core 11a includes the layer made of compound including Si, oxides of Fe are prevented from forming.

The soft magnetic metal particle core 11a is constituted by the above-mentioned Fe—Ni—Si-M based alloy. Particularly, when the amount of P is within the predetermined range, an oxidized state of the soft magnetic metal particles 11 constituting the magnetic element 4 after the heat treatment, that is a coating ratio, a thickness, and the like of the oxide coating film 11b is thought to be regulated appropriately. In case the layer made of oxides including Si further includes P, the coating ratio, the thickness, and the like of the oxide coating film 11b tends to be regulated even more easily. As a result, the magnetic element 4 after the heat treatment exhibits a high specific resistance, and can exhibit desired magnetic properties. Therefore, the magnetic element 4 according to the present embodiment is suitable as a magnetic element which directly contact with the coil conductor 5.

A type of resin 13 is not particularly limited. The resin 13 may be a phenol resin or an epoxy resin. When the resin 13 is a phenol resin or an epoxy resin, the space 12 is particularly easily filled with the resin 13. Also, the resin 13 may preferably be a phenol resin since it is inexpensive and can be handled easily.

By filling the space 12 with the resin 13, strength of the multilayer coil 1 (particularly of the bending strength) is enhanced. Also, since the insulation property between the soft magnetic metal particles is further increased, the inductance L and the Q value tend to improve easily. Further, a reliability and a heat resistance of the multilayer coil improve.

Here, in the element body 2 of the multilayer coil 1, the conductor interspace 4a is the area where the resin 13 is the most difficult to fill in. Therefore, when the resin 13 fills the space 12 of the conductor interspace 4a, then it is considered that the resin 13 has thoroughly filled the space 12 of the element body 2 of the multilayer coil 1.

A method of verifying whether the oxide coating film 11b covering the soft magnetic metal particle core 11a includes the layer made of oxides including Si is not particularly limited. A method of verifying whether the resin 13 has filled the space 12 is not particularly limited. For example, whether the oxide coating film 11b covering the soft magnetic metal particle core 11a includes the layer made of oxides including Si may be visually verified by a SEM-EDS measurement and a STEM-EDS measurement. Similarly, whether the resin 13 has filled the space 12 can be visually verified by a SEM-EDS measurement and a STEM-EDS measurement.

Figure 3:
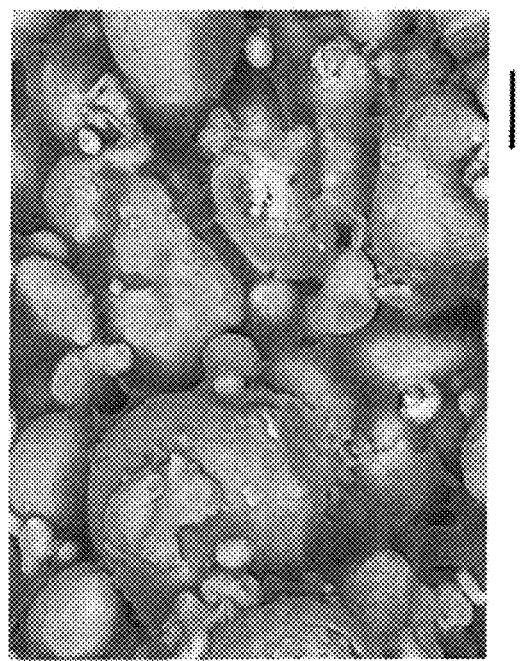
FIG. 3 is a SEM image of a conductor interspace of Example No. 103.
Figure 4:
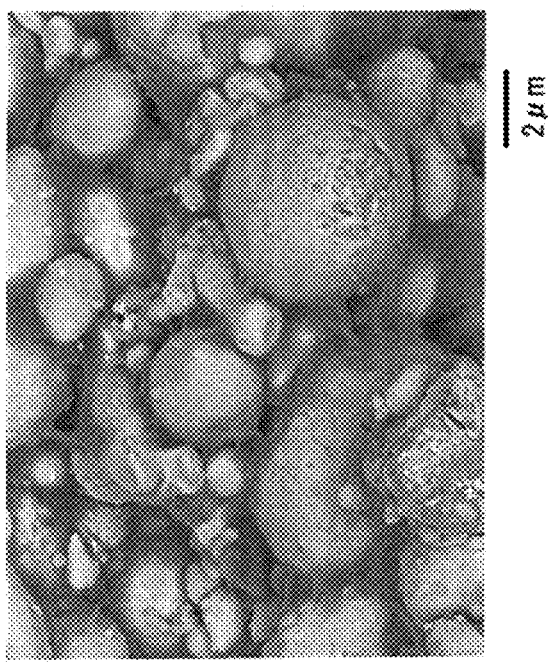
FIG. 4 is an SEM image of a conductor interspace of Example No. 104.

Here, FIG. 3 is a SEM image (10000× magnification) of the conductor interspace of Example No. 103 which is described below, and FIG. 4 is a SEM image (10000× magnification) of the conductor interspace of Example No. 104 which is described below. According to FIG. 3 and FIG. 4, the resin exists besides the soft magnetic metal particles, and the resin has filled the space.

Figure 5:
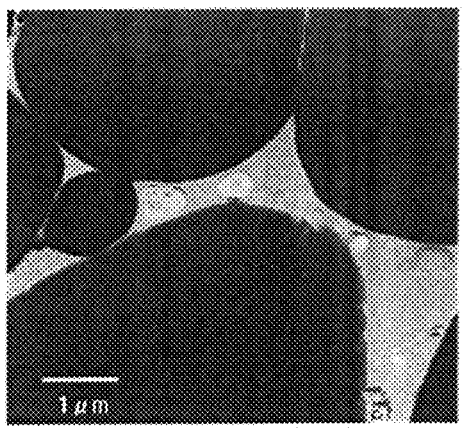
FIG. 5 is a BF image of Example No. 103.
Figure 7:
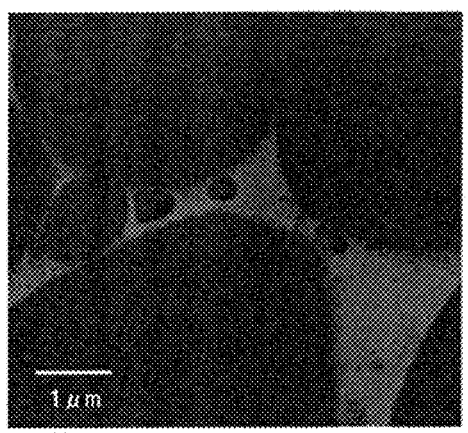
FIG. 7 is a C mapping image of Example No. 103.
Figure 6:
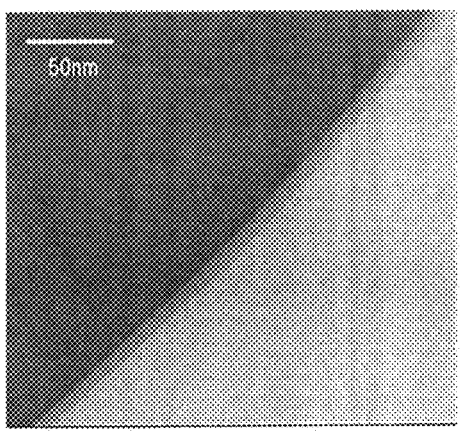
FIG. 6 is a BF image of Example No. 103.
Figure 8:
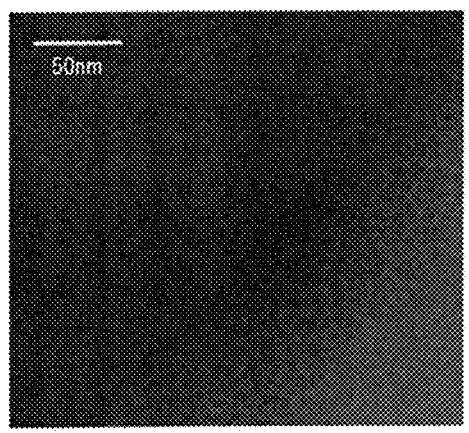
FIG. 8 is a C mapping image of Example No. 103.
Figure 9:
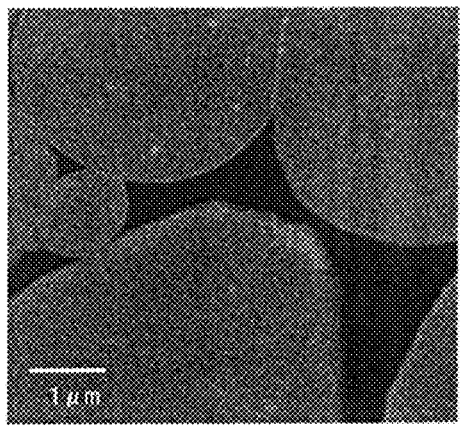
FIG. 9 is a Si mapping image of Example No. 103.
Figure 10:
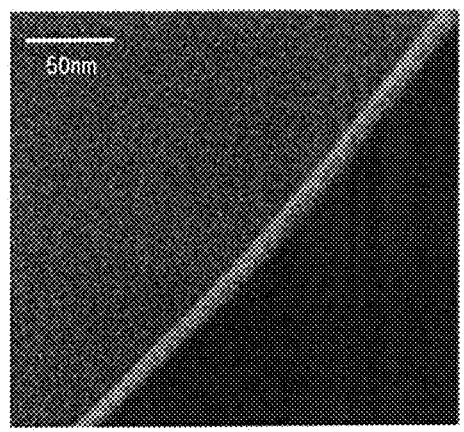
FIG. 10 is a Si mapping image of Example No. 103.
Figure 11:
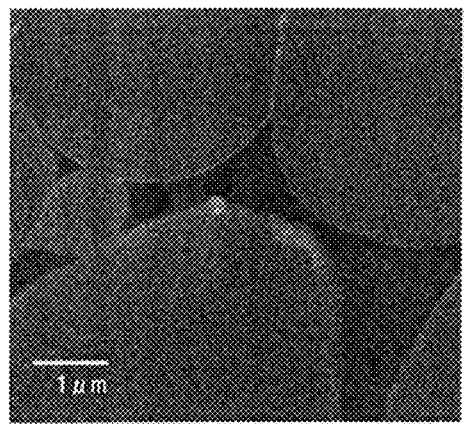
FIG. 11 is an O mapping image of Example No. 103.
Figure 12:
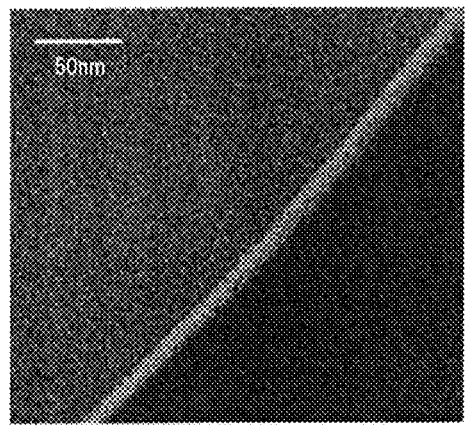
FIG. 12 is an O mapping image of Example No. 103.

Further, FIG. 5 to FIG. 12 show images of STEM-EDS measurement results of the conductor interspace of Example No. 103 which is described in below. FIG. 5 is a bright field image (BF image) obtained using STEM (20000× magnification). FIG. 6 is a bright field image (BF image) obtained using STEM (500000× magnification). FIG. 7 is a C mapping image obtained using STEM-EDS (20000× magnification). FIG. 8 is a C mapping image obtained using STEM-EDS (500000× magnification). FIG. 9 is a Si mapping image obtained using STEM-EDS (20000× magnification). FIG. 10 is a Si mapping image obtained using STEM-EDS (500000× magnification). FIG. 11 is an O mapping image obtained using STEM-EDS (20000× magnification). FIG. 12 is an O mapping image obtained using STEM-EDS (500000× magnification).

FIG. 5 to FIG. 12 show that the resin 13 is filled and cured in the space 12 of the conductor interspace. Further, FIG. 5 to FIG. 12 also show that Si substantially only exists in the soft magnetic metal particles 11, and C substantially only exists in the space 12.

Also, in Example No. 103 described in below, the oxide coating film 11b which covers the soft magnetic metal particle core 11a exists as shown in FIG. 13. The oxide coating film 11b includes a Si oxide layer. Si exists substantially only in the soft magnetic metal particle core 11a and in the oxide coating film 11b. Also, oxides of Si exist substantially only in the oxide coating film 11b. Note that, a Si oxide layer 11b is a layer mainly made of oxides of Si.

Note that, a thickness of the oxide coating film 11b is not particularly limited. The Si oxide layer may be in contact with the soft magnetic metal particle core 11a. For example, the oxide coating film 11b may be made only by the Si oxide layer, or the oxide coating film 11b may be a multilayer structure made of the Si oxide layer and other oxide layer. The Si oxide layer contacting the soft magnetic metal particle core 11a may be made substantially only of oxides of Si. The thickness of the oxide coating film 11b and a thickness of each layer can be measured from STEM-EDS measurement image. In the present embodiment, an average thickness of the coating film, that is an average thickness of the all of the oxide coating films 11b may be within a range of 5 nm or more and 60 nm or less. Note that, the above-mentioned average thickness is an average thickness obtained by measuring a thickness of the oxide coating film 11b from at least 50 soft magnetic metal particles 11.

A method of forming the oxide coating film 11b is not particularly limited. For example, the oxide coating film 11b can be formed by sintering the soft magnetic metal powder according to the present embodiment. Also, the thickness of the oxide coating film 11b and the thickness of each oxide layer can be controlled by regulating the sintering conditions such as a sintering temperature, a sintering time, and the like; or the annealing conditions, and the like. Note that, as the oxide coating film 11b becomes thicker, the space 12 becomes smaller, and an amount of the resin 13 filling the space 12 decreases. Note that, the oxides of Si are included substantially only in the oxide coating film 11b, and preferably the oxides of Si barely exist in the space (space 12) formed between two soft magnetic metal particles 11 which is at outer side than the oxide coating film 11b.

In the multilayer coil 1 according to the present embodiment, the soft magnetic material (the soft magnetic metal particles 11) constituting the magnetic element 4 has a high specific resistivity. This is because the soft magnetic metal particle core 11a is covered by the oxide coating film 11a. Further, when the resin 13 fills the space 12, a plating solution hardly enters to the space 12. Therefore, when the resin 13 fills the space 12, a short circuit is less likely to occur and a high inductance L tends to be easily attained even after plating. Furthermore, the strength of the multilayer coil 1 improves as well.

Also, an area ratio of the space 12 in a cross section of the conductor interspace 4a (the middle part 2b) is preferably 5.0% or more and 35.0% or less with respect to the entire SEM observation image. The area ratio of the space 12 can be controlled by a particle size distribution of the soft magnetic metal particles, and also it can be controlled by a resin amount of a binder resin in a green chip, a molding pressure when the green chip is formed, sintering conditions, annealing conditions, and the like. Also, when the average particle size (D50) of the soft magnetic metal particles is about the same, the inductance L decreases as the space increases and the amount of the resin filling the space increases, however the Q value and the bending strength tend to decrease.

<Method of Producing Soft Magnetic Metal Powder>

An example of a method of producing the soft magnetic metal powder is described. In the present embodiment, the soft magnetic metal powder can be obtained by using the same method as a method of producing a known soft magnetic metal powder. Specifically, the soft magnetic metal powder can be produced by using a gas atomization method, a water atomization method, a rotation disk method, and the like. Among these methods, a water atomization method may be preferably used since the soft magnetic metal powder can be easily obtained.

In a water atomization method, a melted raw material (molten) is supplied as continuous linear fluid through a nozzle provided at a bottom of a crucible. Then, a high-pressured water is blown to the supplied molten to form droplets of the molten, then the droplets are quenched and a fine powder is obtained.

In the present embodiment, for example, raw materials of Fe, Ni, Si, and Co are melted, and P is added to a melted product, then the melted product added with P is formed into a fine powder using a water atomization method. Thereby, the soft magnetic metal powder according to the present embodiment can be produced. Also, for example, when P is included as an impurity in the raw material of Fe, the soft magnetic metal powder including a targeted amount of P may be produced by adjusting a total amount of P as impurity and an amount of P added. Alternatively, by using a plurality of Fe raw materials having different amounts of P, the melted product which includes adjusted amount of P may be formed intro a fine powder by a water atomization method.

<A Method of Producing Soft Magnetic Metal Sintered Body and Coil Type Electronic Component>

First, an example of the method of producing the soft magnetic metal sintered body according to the present embodiment is described. A binder is added to the soft magnetic metal powder which is obtained by the above-mentioned method, and a granulated powder is produced. A type of binder is not particularly limited. For example, an acrylic resin may be mentioned. The obtained granulated powder is molded in order to obtain a molded article. A molding pressure is not particularly limited. For example, the molding pressure may be within a range of 3 ton/cm$^2$ or more and 10 ton/cm$^2$ or less. Next, a binder removal process is carried out. A holding temperature and a holding time of the binder removal process are not particularly limited. For example, the holding temperature may be within a range of 300° C. or higher and 450° C. or lower, and the holding time may be 0.5 hours or longer and 2.0 hours or shorter. Next, the molded article after the binder removal process is sintered and the soft magnetic metal sintered body is obtained. A type of reducing atmosphere is not particularly limited. For example, a mixed gas atmosphere of $N_2$ gas and $H_2$ gas having a hydrogen concentration of 0.1% or higher and 3.0% or less may be mentioned. A sintering temperature and a sintering time are not particularly limited. For example, the sintering temperature may be within a range of 550° C. or higher and 850° C. or lower, and the sintering time may be within a range of 0.5 hours or longer and 3.0 hours or shorter. A thickness of the coating film (the oxide coating film 11b) covering the soft magnetic metal particle core becomes thicker as the sintering time becomes longer and the hydrogen concentration in the reducing atmosphere decreases.

In case of using a Fe—Si—Cr based soft magnetic metal powder in which Fe, Si, and Cr are main components and other elements such as Ni, M, and the like are each included in a small amount, the specific resistance is improved by sintering at a temperature range of 400 to 900° C. in an atmosphere including oxygen. This is because an oxide film including Si and/or Cr having a high insulation property is formed. However, in case the soft magnetic metal powder according to the present embodiment is used, iron oxide is synthesized with priority while sintering is carried out in an atmosphere containing oxygen. As a result, the specific resistance of the soft magnetic metal powder rather decreases, and the inductance L of the coil type electronic component obtained at the end also decreases.

Further, the obtained soft magnetic metal sintered body may be performed with an annealing treatment (heat treatment). Annealing conditions are not particularly limited. For example, an annealing temperature may be 500° C. or higher and 800° C. or lower, and an annealing time may be 0.5 hours or longer and 2.0 hours or shorter. An atmosphere during the annealing treatment is not particularly limited.

For example, an oxygen concentration in the atmosphere may be 0.05% or higher and 21.0% or lower.

Also, the binder removal treatment and sintering may be performed in an oxidized atmosphere such as in the air. However preferably, the binder removal treatment and sintering may be performed under an atmosphere with a weaker oxidizability than in the air atmosphere, for example under a nitrogen atmosphere or a mixed atmosphere of nitrogen and hydrogen. By doing so, the density of the magnetic element is improved while maintaining the specific resistance of the soft magnetic metal particles high, and also the permeability and so on of the magnetic element can be improved. Also, the Si oxide coating film can be easily formed on the surface of the soft magnetic metal particle, and oxides of Fe are less likely formed. As a result, the decrease of inductance L caused by oxidation of Fe can be prevented.

Note that, the amount of P included in the soft magnetic metal particles after the heat treatment is the same as the amount of P included in the soft magnetic metal particles prior to the heat treatment.

Further, the coil type electronic component is formed by winding a coil to the obtained soft magnetic metal sintered body. A method of producing the coil type electronic component is not particularly limited, and any methods used in the technical filed of the present disclosure can be used.

<Method of Producing Multilayer Coil Type Electronic Component>

As an example of a method of producing the multilayer coil type electronic component, a method of producing the multilayer coil type electronic component shown in FIG. 1 is described in below. First, the obtained soft magnetic metal powder is formed into a slurry together with additives such as a solvent, a binder, and the like to produce a paste. Then, using this paste, a green sheet which forms the magnetic element (the soft magnetic metal sintered body) after sintering is formed. Next, silver (Ag) and the like is placed on the green sheet in a predetermined pattern to form a coil conductor. Then, the green sheet formed with a coil conductor pattern is stacked in a plurality of layers, and each coil conductor pattern is connected via a through hole, thereby a multilayer body of green sheets in which a coil conductor is formed three dimensionally and spirally is obtained.

By performing heat treatments (the binder removal step and the sintering step) to the obtained multilayer body, the binder is removed, and the sintered body (element body) in which the soft magnetic metal particles included in the soft magnetic metal powder is connected and fixed (formed as one body) with each other is obtained. A holding temperature (binder removing temperature) of the binder removal step is not particularly limited as long as the binder can be disintegrated into gas. For example, the holding temperature may be within a range of 300° C. or higher and 450° C. or lower. Also, a holding time of the binder removal step (binder removing time) is not particularly limited. For example, the holding time of the binder removal step may be 0.5 hours or longer and 2.0 hours or shorter.

The holding temperature of the sintering step (a sintering temperature) is not particularly limited as long as the soft magnetic metal particles included in the soft magnetic metal powder can be connected with each other. The holding temperature of the sintering step may be within a range of 550° C. or higher and 850° C. or lower. Also, a holding time of the sintering step (a sintering time) is not particularly limited. For example, the temperature holding time of the sintering step may be within a range of 0.5 hours or longer and 3.0 hours or less.

Note that, the amount of phosphorous (P) included in the soft magnetic metal particles after the heat treatment is the same as the amount of phosphorous (P) included in the soft magnetic metal particles prior to the heat treatment.

Note that, in the present embodiment, preferably the atmosphere during the binder removal step and the atmosphere during the sintering step are adjusted.

An annealing treatment (heat treatment) may be performed after sintering. Conditions in case of performing the annealing treatment are not particularly limited. For example, the annealing treatment may be performed within a range of 500 to 800° C. for 0.5 hours to 2.0 hours. Also, the atmosphere after the annealing treatment is not particularly limited.

Note that, the composition of the soft magnetic metal particles after the above-mentioned heat treatment is substantially the same as the soft magnetic metal powder prior to the heat treatment.

Next, the terminal electrode is formed to the element body. A method of forming the terminal electrode is not particularly limited, and usually a slurry is formed using metals (such as Ag) which form the terminal electrode together with additives such as a solvent, a binder, and the like to produce the terminal electrode.

Next, when the magnetic element includes the resin, the space can be filled with the resin by impregnating the resin to the element body. A method of impregnating the resin is not particularly limited. For example, a method using a vacuum impregnation may be mentioned.

A vacuum impregnation is a method of immersing the above-mentioned multilayer coil element in the resin, and then adjusting the air pressure. The resin enters to the magnetic element included in the element body by lowering the air pressure. Also, since the space exists from the surface to the inside of the magnetic element, the resin fills the inside of the magnetic element by a capillary action through the space, particularly by entering to the conductor interspace which is the hardest area to fill the resin, the space is filled with the resin. Then, the resin is heat cured. Heating conditions may differ depending on a type of resin.

A type of resin is not particularly limited. Preferably, the space is filled with the resin at the end. For example, particularly when the phenol resin or the epoxy resin is used, the space inside the magnetic element (the conductor interspace) is thoroughly filled with the resin, then the space is sufficiently filled with the resin even after curing. Further, the resin does not easily disintegrate even when the resin is heated, thus a heat resistance is high. On the other hand, when a silicone resin is used, the resin exists in a film form on a surface of the soft magnetic metal particle particularly at the surface part, thus the resin does not sufficiently enter the space at the inside of the magnetic element (particularly to the conductor interspace). Further, the resin disintegrates when it is heated at a temperature of 300° C. or higher, thus a heat resistance is low.

The amount of resin in the magnetic element of the multilayer coil type electronic component obtained at the end is preferably within a range of 0.5 weight % or more and 3.0 weight % or less. Note that, the amount of resin can be controlled by changing a resin solution concentration, an immersing time, the number of times of immersing, and the like during impregnation.

In the present embodiment, after the resin has been filled, electroplating can be performed to the terminal electrode.

Since the space is filled with the resin, even when the magnetic element is introduced into a plating solution, the plating solution barely enters to the inside of the magnetic element. Therefore, even after plating is performed, a short circuit does not occur at the inside of the multilayer coil type electronic component, and thus the inductance L is maintained high.

Second Embodiment

Hereinafter, the second embodiment is described, and characteristics which are not mentioned in below are the same as the first embodiment.

The soft magnetic metal powder according to the second embodiment includes a plurality of soft magnetic metal particles. The soft magnetic particles are each constituted by a Fe—Ni based alloy. The Fe—Ni based alloy may further include Cr. Further, the Fe—Ni based alloy may include Si and/or M. In case M is included, M may preferably be Co. Further, in the Fe—Ni based alloy of the present embodiment, when a total amount of Fe, Ni, Si, M, and Cr is 100 mass %, the amount of Cr is less than 2.0 mass %. The amount of Cr may be within a range of 0.1 mass % or more and 1.8 mass % or less, or it may be within a range of 0.5 mass % or more and 1.5 mass % or less.

By particularly having the amount of Cr within the above-mentioned range, the permeability μ and the specific resistance ρ are increased.

Also, the soft magnetic metal powder according to the second embodiment may further include P. When a total amount of Fe, Ni, Si, M, and Cr is 100 mass %, P may be included within a range of 100 ppm or more and 5000 ppm or less, or 200 ppm or more and 2000 ppm or less.

Also, the amount of Ni may be within a range of 15.0 mass % or more and 80.0 mass % or less, or may be within a range of 15.0 mass % or more and 55.0 mass % or less. In case Si is included, the amount of Si may be within a range of 1.0 mass % or more and 6.0 mass % or less, may be within a range of 2.0 mass % or more and 6.0 mass % or less, or may be within a range of 2.0 mass % or more and 4.0 mass % or less. In case M is included, the amount of M may be within a range of 1.0 mass % or more and 50.0 mass % or less, or may be within a range of 2.0 mass % or more and 40.0 mass % or less.

Further, the amount of Ni may be within a range of 22.0 mass % or more and 42.0 mass % or less. The amount of Si may be within a range of 2.5 mass % or more and 5.5 mass % or less, or may be within a range of 2.5 mass % or more and 4.0 mass % or less. The amount of M may be within a range of 5.0 mass % or more and 32.0 mass % or less. The amount of P may be within a range of 300 ppm or more and 2000 ppm or less.

Third Embodiment

Hereinafter, the third embodiment is described, the characteristics which are not mentioned in below are the same as the first and second embodiments.

In the third embodiment, the composition of the soft magnetic metal particles is not particularly limited except that the amount of Cr is less than 2.0 mass % (not including 0 mass %). The soft magnetic metal particles may be the same as that of the second embodiment.

A coil type electronic component according to the third embodiment produced by using the soft magnetic metal powder including the soft magnetic metal particles is a coil type electronic component including a magnetic element and a coil conductor embedded in the magnetic element, wherein
the magnetic element includes soft magnetic metal particles;
the soft magnetic metal particles are each covered with a coating film;
the coating film includes a first layer contacting the soft magnetic metal particle and a second layer contacting the first layer;
the first layer includes Si or oxides including Si; and
the second layer includes Cr.

The coating film (the oxide coating film 11b) which covers the soft magnetic metal particle includes the first layer and the second layer. As the compositions of the first layer and the second layer are as the above-mentioned compositions, the soft magnetic metal sintered body including the soft magnetic metal particles attains improved permeability μ and the specific resistivity ρ. Further, the coil type electronic component having the magnetic element including the soft magnetic metal particles attains improved Q value and inductance L.

Note that, when the amount of Cr in the soft magnetic metal particles is 2.0 mass % or more, the permeability μ decreases. Also, the Q value and the inductance L also decrease.

The first layer may contain a larger amount of Si than in the amount of Si is included in the soft magnetic metal particle, and the amount of Fe in the first layer may be lower than the amount of Si included in the soft magnetic metal particle. The second layer may contain a larger amount of Si, Cr, and Ni than the soft magnetic metal particle, and the amount of Fe in the second layer may be lower than that in the soft magnetic metal particle.

The average thickness of the first layer represented by D1 and the average thickness of the second layer represented by D2 may satisfy $0.5 \leq D2/D1 \leq 1.5$. When D2/D1 is within the above-mentioned range, the oxide coating film with appropriate thickness tends to be formed easily, and the soft magnetic metal sintered body tends to attain good permeability μ and specific resistance ρ.

D2 may be within a range of 2.5 nm or more and 30 nm or less, or may be within a range of 5 nm or more and 20 nm or less. When D2 is 30 nm or less, the permeability μ tends to improve easily, and the Q value and the inductance L of the coil type electronic component tend to improve easily. Also, when D2 is 2.5 nm or more, the specific resistance ρ tends to improve easily, and a plating elongation of the coil type electronic component tends to be suppressed easily.

A method of covering the soft magnetic metal particle included in the magnetic element with the coating film is not particularly limited. For example, a method of forming the first layer and the second layer of the coating film at the stage of the soft magnetic metal powder, and a method of forming the first layer and the second layer to the surface of the soft magnetic metal particle while sintering may be mentioned. By sintering the soft magnetic metal particle including Si and Cr under a reducing atmosphere, the first layer and the second layer are formed to the surface of each of the soft magnetic metal particles. Note that, under the same sintering temperature, the first layer and the second layer become thicker as the sintering time becomes longer and as the hydrogen concentration in the sintering atmosphere increases. When the sintering time is the same, the second layer becomes thicker as the sintering temperature increases and as the hydrogen concentration of the sintering atmosphere decreases. Further, as the amount of Cr included in the soft magnetic metal particle increases, the second layer becomes thicker.

The soft magnetic metal particles included in the coil type electronic component of the second embodiment may be each covered with the same coating film which covers each of the soft magnetic metal particles included in the coil type electronic component of the third embodiment.

Hereinabove, the embodiments of the present disclosure have been described, however the present disclosure is not limited to the above-mentioned embodiments, and various modifications may be performed within the scope of the present disclosure.

Note that, as the coil type electronic component, a transformer, a choke coil, a coil, and the like are known. Also, the coil type electronic component according to the present embodiment is suitably used as an inductor, an impedance, and the like for a power circuit of various electronic devices such as mobile phones and the like.

EXAMPLES

Hereinafter, the present disclosure is described in further detail using examples, however the present disclosure is not limited to the examples.

Experiment Example 1

First, as raw materials, a Fe—Ni alloy, a simple substance of Fe, a simple substance of Ni, a simple substance of Si, a simple substance of M were prepared. Each alloy and/or simple substances were in shape of ingot, chunk, or shot. Next, these raw materials were mixed so to obtain compositions shown in Table 1 to Table 3, and then a mixed product was placed in a crucible provided inside of a water atomization apparatus. Note that, Examples 2b to 2p shown in Table 3 were examples performed under the same conditions as Example 2 except that a type of M was changed.

Next, under a reducing atmosphere, using a work coil provided at outside of the crucible, the crucible was heated to a temperature of 1600° C. or higher using a high frequency induction. Thereby, the ingot, chunk, or shot inside the crucible was melted and mixed, thereby a molten was obtained. Note that, an amount of phosphorous was adjusted by regulating an amount of phosphorous included in the raw material of the simple substance of Fe when the raw materials of the soft magnetic metal powder were melted and mixed.

Next, a high-pressured water (50 MPa) was collided to the molten which was supplied in a linear continuous liquid form from a nozzle provided to the crucible, thereby the molten was formed into droplets. The droplets were quenched, dehydrated, dried, and classified at the same time, thereby the soft magnetic metal powder including Fe—Ni—Si-M based alloy particles was produced. An average particle size (D50) of the soft magnetic metal powder was regulated so to satisfy the value shown in Table 1 to Table 3.

As a result of composition analysis using an ICP method performed to the obtained soft magnetic metal powder, the soft magnetic metal powder used in each example and comparative example was confirmed to have the composition shown in Table 1 to Table 3. Further, it was confirmed that elements other than Fe, Ni, Si, M, and P, such as Cr and the like, were substantially not included.

An acrylic resin as a binder was added to the obtained soft magnetic metal powder, and a granulated powder was produced. This granulated powder was molded at a pressure of 6 ton/cm$^2$, and a toroidal shape having an outer diameter of 13 mm×an inner diameter of 6 mm×a height of 2.7 to 3.3 mm was formed. Next, under an inert atmosphere, a binder removing process was performed to a molded article while maintaining the temperature at 400° C. Then, the molded article of which the binder had been removed was sintered under a reducing atmosphere (a mixed gas atmosphere of $N_2$ gas and $H_2$ gas and a hydrogen concentration of 1.0%) at 750° C. for 1 hour, thereby a sintered body was obtained. Note that, the above-mentioned inert atmosphere was $N_2$ gas atmosphere, and the above-mentioned reducing atmosphere was a mixed gas atmosphere of $N_2$ gas and $H_2$ gas. Note that, the hydrogen concentration of the above-mentioned mixed gas atmosphere was 1.0%. Further, the obtained sintered body was heat treated under an atmosphere having an oxygen partial pressure of 1% at 700° C. for 1 hour, thereby a sintered body for evaluation was obtained.

Regarding the sintered body for evaluation, a permeability ($\mu$) and a specific resistance ($\rho$) were measured using below described methods.

The permeability was measured by a coaxial method at f=2 MHz using RF impedance material analyzer (made by Agilent Technologies:4991A).

Regarding the results shown in Table 1, a permeability $\mu$ of a sample was compared to a permeability $\mu$ of a comparative example (Comparative example 8, 1, 10, or 12) made by using the same compositions as said sample except that the amount of P in said comparative example was 50 ppm; and an increase rate ($\Delta\mu/\mu$) was calculated. The increase rate $\Delta\mu/\mu$ of 20.0% or more was considered good.

Regarding Comparative examples 3 and 4; and Examples 2, 5 to 6, 5a, and 6a shown in Table 2, a permeability $\mu$ of a sample was compared to a permeability $\mu$ of Comparative example 3 having the same composition as said sample except that the amount of Si in Comparative example 3 was 1.5 mass %. Thereby, an increase rate of permeability ($\Delta\mu/\mu$) was calculated. An increase rate $\Delta\mu/\mu$ of 20.0% or more was considered good.

Regarding Comparative examples 5, 6a, and 6; and Examples 7 to 10, 7a, and 9a shown in Table 2, a permeability $\mu$ of a sample was compared to a permeability $\mu$ of Comparative example 5 having the same composition as said sample except that the amount of Co of Comparative example 5 was 1.0 mass %. Then, an increase rate of permeability ($\Delta\mu/\mu$) was calculated. An increase rate $\Delta\mu/\mu$ of 20.0% or more was considered good.

Regarding Comparative examples 7 and 7a; and Examples 11 and 12 shown in Table 2, a permeability $\mu$ of a sample was compared to a permeability $\mu$ of Comparative example 7 having the same composition as said sample except that the amount of Ni of Comparative example 7 was 56.0 mass %. Thereby, an increase rate of permeability ($\Delta\mu/\mu$) was calculated. The increase rate $\Delta\mu/\mu$ of 20.0% or more was considered good.

Regarding the results shown in Table 3, a permeability $\mu$ of a sample was compared to a permeability $\mu$ of Comparative example 1 having the same composition as said sample except that the type of M of Comparative example 1 was changed and the amount of P of Comparative example 1 was 50 ppm. Thereby, an increase rate of permeability ($\Delta\mu/\mu$) was calculated. An increase rate $\Delta\mu/\mu$ of 20.0% or more was considered good.

Regarding specific resistance $\rho$, In—Ga electrode was coated to both sides of the obtained sintered body, and DC current was measured using an ultrahigh resistance meter (made by ADVANTEST Technology:R8340), and the specific resistance $\rho$ was calculated from a volume of the sintered body and DC current. The specific resistance $\rho$ of 1.0 E06 Ω·m or more was considered good.

TABLE 1

| | Soft magnetic metal powder | | | | | | Sintered body | | |
| --- | --- | --- | --- | --- | --- | --- | --- | --- | --- |
| | (mass %) | | | | (ppm) | (μm) | | (%) | (Ω·m) |
| Sample No. | Fe | Ni | Si | Co | P | D50 | μ | Δμ/μ | ρ |
| Comparative example 8 | 49.0 | 42.0 | 3.0 | 6.0 | 50 | 2.0 | 20.0 | 0 | 3E05 |
| Example 13 | 49.0 | 42.0 | 3.0 | 6.0 | 100 | 2.0 | 25.2 | 26.0 | 3E06 |
| Example 13a | 49.0 | 42.0 | 3.0 | 6.0 | 300 | 2.0 | 26.5 | 32.5 | 8E06 |
| Example 13b | 49.0 | 42.0 | 3.0 | 6.0 | 500 | 2.0 | 27.0 | 35.0 | 1E07 |
| Example 14 | 49.0 | 42.0 | 3.0 | 6.0 | 1000 | 2.0 | 27.5 | 37.5 | 3E07 |
| Example 14a | 49.0 | 42.0 | 3.0 | 6.0 | 2000 | 2.0 | 26.8 | 34.0 | 2E07 |
| Example 15 | 49.0 | 42.0 | 3.0 | 6.0 | 5000 | 2.0 | 24.8 | 24.0 | 9E06 |
| Comparative example 9 | 49.0 | 42.0 | 3.0 | 6.0 | 6000 | 2.0 | 23.0 | 15.0 | 2E06 |
| Comparative example 1 | 49.0 | 42.0 | 3.0 | 6.0 | 50 | 5.0 | 33.5 | 0 | 1E05 |
| Example 1 | 49.0 | 42.0 | 3.0 | 6.0 | 100 | 5.0 | 40.5 | 20.9 | 3E06 |
| Example 1a | 49.0 | 42.0 | 3.0 | 6.0 | 300 | 5.0 | 43.7 | 30.4 | 1E07 |
| Example 2 | 49.0 | 42.0 | 3.0 | 6.0 | 500 | 5.0 | 45.0 | 34.3 | 4E07 |
| Example 2a | 49.0 | 42.0 | 3.0 | 6.0 | 1000 | 5.0 | 44.0 | 31.3 | 3E07 |
| Example 3 | 49.0 | 42.0 | 3.0 | 6.0 | 2000 | 5.0 | 42.5 | 26.9 | 2E07 |
| Example 4 | 49.0 | 42.0 | 3.0 | 6.0 | 5000 | 5.0 | 40.5 | 20.9 | 5E06 |
| Comparative example 2 | 49.0 | 42.0 | 3.0 | 6.0 | 6000 | 5.0 | 37.0 | 10.4 | 5E05 |
| Comparative example 10 | 49.0 | 42.0 | 3.0 | 6.0 | 50 | 10.0 | 44.0 | 0 | 5E04 |
| Example 16 | 49.0 | 42.0 | 3.0 | 6.0 | 100 | 10.0 | 53.5 | 21.6 | 5E06 |
| Example 16a | 49.0 | 42.0 | 3.0 | 6.0 | 300 | 10.0 | 57.0 | 29.5 | 1E07 |
| Example 16b | 49.0 | 42.0 | 3.0 | 6.0 | 500 | 10.0 | 59.2 | 34.5 | 2E07 |
| Example 17 | 49.0 | 42.0 | 3.0 | 6.0 | 1000 | 10.0 | 58.5 | 33.0 | 1E07 |
| Example 18a | 49.0 | 42.0 | 3.0 | 6.0 | 2000 | 10.0 | 57.0 | 29.5 | 8E06 |
| Example 18 | 49.0 | 42.0 | 3.0 | 6.0 | 5000 | 10.0 | 55.0 | 25.0 | 4E06 |
| Comparative example 11 | 49.0 | 42.0 | 3.0 | 6.0 | 6000 | 10.0 | 47.0 | 6.8 | 5E05 |
| Comparative example 12 | 49.0 | 42.0 | 3.0 | 6.0 | 50 | 15.0 | 48.0 | 0 | 2E04 |
| Example 19 | 49.0 | 42.0 | 3.0 | 6.0 | 100 | 15.0 | 58.0 | 20.8 | 2E06 |
| Example 19a | 49.0 | 42.0 | 3.0 | 6.0 | 300 | 15.0 | 60.3 | 25.6 | 5E06 |
| Example 19b | 49.0 | 42.0 | 3.0 | 6.0 | 500 | 15.0 | 61.0 | 27.1 | 5E06 |
| Example 20 | 49.0 | 42.0 | 3.0 | 6.0 | 1000 | 15.0 | 62.0 | 29.2 | 7E06 |
| Example 20a | 49.0 | 42.0 | 3.0 | 6.0 | 2000 | 15.0 | 60.5 | 26.0 | 5E06 |
| Example 21 | 49.0 | 42.0 | 3.0 | 6.0 | 5000 | 15.0 | 58.3 | 21.5 | 2E06 |
| Comparative example 13 | 49.0 | 42.0 | 3.0 | 6.0 | 6000 | 15.0 | 48.3 | 0.6 | 1E05 |

TABLE 2

| | Soft magnetic metal powder | | | | | | Sintered body | | |
| --- | --- | --- | --- | --- | --- | --- | --- | --- | --- |
| | (mass %) | | | | (ppm) | (μm) | | (%) | (Ω·m) |
| Sample No. | Fe | Ni | Si | Co | P | D50 | μ | Δμ/μ | ρ |
| Comparative example 3 | 50.5 | 45.0 | 1.5 | 3.0 | 500 | 5.0 | 32.0 | 0 | 1E04 |
| Example 5 | 50.5 | 44.5 | 2.0 | 3.0 | 500 | 5.0 | 38.8 | 21.3 | 1E06 |
| Example 5a | 50.5 | 44.0 | 2.5 | 3.0 | 500 | 5.0 | 43.0 | 34.4 | 7E06 |
| Example 2 | 49.0 | 42.0 | 3.0 | 6.0 | 500 | 5.0 | 45.0 | 40.6 | 1E07 |
| Example 6a | 47.5 | 41.0 | 5.5 | 6.0 | 500 | 5.0 | 42.2 | 31.9 | 2E07 |
| Example 6 | 47.0 | 41.0 | 6.0 | 6.0 | 500 | 5.0 | 39.8 | 24.4 | 3E07 |
| Comparative example 4 | 46.5 | 40.5 | 7.0 | 6.0 | 500 | 5.0 | 32.3 | 0.9 | 5E06 |
| Comparative example 5 | 51.0 | 45.0 | 3.0 | 1.0 | 500 | 5.0 | 32.3 | 0 | 3E06 |
| Example 7 | 50.5 | 44.5 | 3.0 | 2.0 | 500 | 5.0 | 40.2 | 24.4 | 8E06 |
| Example 7a | 49.5 | 42.5 | 3.0 | 5.0 | 500 | 5.0 | 42.2 | 30.7 | 9E06 |
| Example 2 | 49.0 | 42.0 | 3.0 | 6.0 | 500 | 5.0 | 45.0 | 39.3 | 1E07 |
| Example 8 | 45.0 | 32.0 | 3.0 | 20.0 | 500 | 5.0 | 44.5 | 37.8 | 2E07 |
| Example 9 | 43.0 | 24.0 | 3.0 | 30.0 | 500 | 5.0 | 45.5 | 40.9 | 3E07 |
| Example 9a | 43.0 | 22.0 | 3.0 | 32.0 | 500 | 5.0 | 43.7 | 33.1 | 1E07 |
| Example 10 | 37.0 | 20.0 | 3.0 | 40.0 | 500 | 5.0 | 41.2 | 27.6 | 4E06 |

TABLE 2-continued

| Sample No. | Soft magnetic metal powder (mass %) | | | | (ppm) | (μm) | Sintered body | | |
|---|---|---|---|---|---|---|---|---|---|
| | Fe | Ni | Si | Co | P | D50 | μ (%) | Δμ/μ | ρ (Ω · m) |
| Comparative example 6a | 41.5 | 15.0 | 3.0 | 40.5 | 500 | 5.0 | 36.2 | 12.1 | 2E06 |
| Comparative example 6 | 43.5 | 13.0 | 3.0 | 40.5 | 500 | 5.0 | 36.5 | 13.0 | 1E06 |
| Comparative example 7 | 40.0 | 56.0 | 2.0 | 2.0 | 500 | 5.0 | 33.0 | 0 | 3E05 |
| Example 11 | 40.0 | 55.0 | 3.0 | 2.0 | 500 | 5.0 | 45.0 | 36.4 | 8E06 |
| Example 12 | 39.0 | 15.0 | 6.0 | 40.0 | 500 | 5.0 | 40.0 | 21.2 | 3E06 |
| Comparative example 7a | 39.5 | 14.5 | 6.0 | 40.0 | 500 | 5.0 | 37.0 | 12.1 | 2E06 |

TABLE 3

| Sample No. | Soft magnetic metal powder | (ppm) P | (μm) D50 | Sintered body μ | (%) Δμ/μ | (Ω · m) ρ |
|---|---|---|---|---|---|---|
| | M | | | | | |
| Comparative example 1 | Co | 50 | 5.0 | 33.5 | 0 | 1E05 |
| Example 2 | Co | 500 | 5.0 | 45.0 | 34.3 | 4E07 |
| Example 2b | B | 500 | 5.0 | 40.2 | 20.0 | 8E06 |
| Example 2c | Mn | 500 | 5.0 | 42.0 | 25.4 | 1E06 |
| Example 2d | Ti | 500 | 5.0 | 41.2 | 23.0 | 7E06 |
| Example 2e | Zr | 500 | 5.0 | 40.8 | 21.8 | 6E06 |
| Example 2f | Hf | 500 | 5.0 | 40.3 | 20.3 | 7E06 |
| Example 2g | Nb | 500 | 5.0 | 40.9 | 22.1 | 1E06 |
| Example 2h | Ta | 500 | 5.0 | 40.2 | 20.0 | 1E06 |
| Example 2i | Mo | 500 | 5.0 | 43.5 | 29.9 | 9E06 |
| Example 2j | Mg | 500 | 5.0 | 40.5 | 20.9 | 6E06 |
| Example 2k | Ca | 500 | 5.0 | 40.7 | 21.5 | 5E06 |
| Example 2l | Sr | 500 | 5.0 | 40.3 | 20.3 | 1E06 |
| Example 2m | Ba | 500 | 5.0 | 40.3 | 20.3 | 1E06 |
| Example 2n | Zn | 500 | 5.0 | 41.2 | 23.0 | 4E06 |
| Example 2o | Al | 500 | 5.0 | 43.5 | 29.9 | 9E06 |
| Example 2p | Nd | 500 | 5.0 | 40.4 | 20.6 | 1E06 |
| Comparative example 2 | Co | 6000 | 5.0 | 37.0 | 10.4 | 5E05 |

According to Table 1 and Table 3, examples having the amount of P within a range of 100 ppm or more and 5000 ppm or less exhibited good permeability μ and specific resistance ρ compared to corresponding comparative example having the same composition as said examples except that the amount of P in the corresponding comparative example was 50 ppm. The comparative examples including 50 ppm of P had a decreased specific resistance ρ. Also, when the amount of P was 6000 ppm, such comparative examples had tendency to exhibit decreased permeability μ and specific resistance ρ compared to the examples having the same composition except that the amount of P was within a range of 100 to 5000 ppm.

According to Table 2, the examples containing each component in an amount within a predetermined range tended to exhibit good permeability μ and specific resistance ρ compared to the corresponding comparative examples in which the amount of Ni, Si, and/or Co was out of a predetermined range.

Experiment Example 2

Experiment example 2 was performed as same as Experiment example 1 except that a simple substance of Cr was prepared as raw material, and that the soft magnetic metal powder did not substantially include elements other than Fe, Ni, Si, M, Cr, and P.

Regarding the results of Table 4 to Table 6, a permeability μ of a sample containing Cr in an amount of less than 2.0 mass % was compared to the permeability μ of Comparative example 537 containing 2.0 mass % of Cr, and an increase rate (Δμ/μ) was calculated. An increase rate Δμ/μ of 20.0% or more was considered good.

Examples 538 to 542 shown in Table 4 were examples in which the amount of Cr was mainly changed from that of Comparative example 537. Examples 543 to 546, and 544a shown in Table 4 were examples in which the amount of Si was mainly changed from that of Example 540. Examples 547 to 550 shown in Table 5 were examples in which the amount of P was changed from that of Example 540. Examples 540b to 540p shown in Table 6 were Examples carried out under the same conditions as Example 540 except for changing the type of M.

TABLE 4

| Sample No. | Soft magnetic metal powder (mass %) | | | | | (ppm) | (μm) | Sintered body | | |
|---|---|---|---|---|---|---|---|---|---|---|
| | Fe | Ni | Si | Co | Cr | P | D50 | μ (%) | Δμ/μ | ρ (Ω · m) |
| Comparative example 537 | 41.0 | 24.0 | 3.0 | 30.0 | 2.0 | 500 | 5.0 | 39.0 | 0 | 7E07 |
| Example 538 | 41.2 | 24.0 | 3.0 | 30.0 | 1.8 | 500 | 5.0 | 48.0 | 23.1 | 6E07 |
| Example 539 | 41.5 | 24.0 | 3.0 | 30.0 | 1.5 | 500 | 5.0 | 50.3 | 29.0 | 5E07 |
| Example 540 | 42.0 | 24.0 | 3.0 | 30.0 | 1.0 | 500 | 5.0 | 52.0 | 33.3 | 5E07 |
| Example 541 | 42.5 | 24.0 | 3.0 | 30.0 | 0.5 | 500 | 5.0 | 50.6 | 29.7 | 4E07 |
| Example 542 | 42.9 | 24.0 | 3.0 | 30.0 | 0.1 | 500 | 5.0 | 48.7 | 24.9 | 3E07 |

TABLE 4-continued

| | Soft magnetic metal powder | | | | | | | Sintered body | | |
|---|---|---|---|---|---|---|---|---|---|---|
| | (mass %) | | | | | (ppm) | (μm) | | (%) | (Ω · m) |
| Sample No. | Fe | Ni | Si | Co | Cr | P | D50 | μ | Δμ/μ | ρ |
| Example 543 | 43.0 | 24.0 | 2.0 | 30.0 | 1.0 | 500 | 5.0 | 48.0 | 23.1 | 1E07 |
| Example 544 | 42.5 | 24.0 | 2.5 | 30.0 | 1.0 | 500 | 5.0 | 50.0 | 28.2 | 7E07 |
| Example 540 | 42.0 | 24.0 | 3.0 | 30.0 | 1.0 | 500 | 5.0 | 52.0 | 33.3 | 8E07 |
| Example 544a | 41.5 | 23.5 | 4.0 | 30.0 | 1.0 | 500 | 5.0 | 51.6 | 31.3 | 8E07 |
| Example 545 | 40.5 | 23.0 | 5.5 | 30.0 | 1.0 | 500 | 5.0 | 49.2 | 26.2 | 9E07 |
| Example 546 | 40.0 | 23.0 | 6.0 | 30.0 | 1.0 | 500 | 5.0 | 48.3 | 23.8 | 9E07 |

TABLE 5

| | Soft magnetic metal powder | | | | | | | Sintered body | | |
|---|---|---|---|---|---|---|---|---|---|---|
| | (mass %) | | | | | (ppm) | (μm) | | (%) | (Ω · m) |
| Sample No. | Fe | Ni | Si | Co | Cr | P | D50 | μ | Δμ/μ | ρ |
| Comparative example 537 | 41.0 | 24.0 | 3.0 | 30.0 | 2.0 | 500 | 5.0 | 39.0 | 0 | 7E07 |
| Example 547 | 42.0 | 24.0 | 3.0 | 30.0 | 1.0 | 100 | 5.0 | 48.4 | 24.1 | 3E07 |
| Example 548 | 42.0 | 24.0 | 3.0 | 30.0 | 1.0 | 300 | 5.0 | 50.7 | 30.0 | 6E07 |
| Example 540 | 42.0 | 24.0 | 3.0 | 30.0 | 1.0 | 500 | 5.0 | 52.0 | 33.3 | 8E07 |
| Example 549 | 42.0 | 24.0 | 3.0 | 30.0 | 1.0 | 2000 | 5.0 | 49.5 | 26.9 | 7E07 |
| Example 550 | 42.0 | 24.0 | 3.0 | 30.0 | 1.0 | 5000 | 5.0 | 48.0 | 23.1 | 3E07 |

TABLE 6

| | Soft magnetic metal powder | | | Sintered body | | |
|---|---|---|---|---|---|---|
| | | (mass %) | (μm) | | (%) | (Ω · m) |
| Sample No. | M | Cr | D50 | μ | Δμ/μ | ρ |
| Comparative example 537 | Co | 2.0 | 5.0 | 39.0 | 0 | 7E07 |
| Example 540 | Co | 1.0 | 5.0 | 52.0 | 33.3 | 8E07 |
| Example 540b | B | 1.0 | 5.0 | 47.1 | 20.8 | 7E07 |
| Example 540c | Mn | 1.0 | 5.0 | 49.0 | 25.6 | 1E07 |
| Example 540d | Ti | 1.0 | 5.0 | 48.3 | 23.8 | 6E07 |
| Example 540e | Zr | 1.0 | 5.0 | 47.8 | 22.6 | 6E07 |
| Example 540f | Hf | 1.0 | 5.0 | 47.3 | 21.3 | 6E07 |
| Example 540g | Nb | 1.0 | 5.0 | 47.8 | 22.6 | 1E07 |
| Example 540h | Ta | 1.0 | 5.0 | 47.0 | 20.5 | 1E07 |
| Example 540i | Mo | 1.0 | 5.0 | 50.5 | 29.5 | 7E07 |
| Example 540j | Mg | 1.0 | 5.0 | 47.6 | 22.1 | 6E07 |
| Example 540k | Ca | 1.0 | 5.0 | 47.8 | 22.6 | 5E07 |
| Example 540l | Sr | 1.0 | 5.0 | 47.2 | 21.0 | 1E07 |
| Example 540m | Ba | 1.0 | 5.0 | 47.1 | 20.8 | 1E07 |
| Example 540n | Zn | 1.0 | 5.0 | 48.3 | 23.8 | 5E07 |
| Example 540o | Al | 1.0 | 5.0 | 50.8 | 30.3 | 7E07 |
| Example 540p | Nd | 1.0 | 5.0 | 47.4 | 21.5 | 1E07 |

According to Table 4 to Table 6, when the amount of Cr was less than 2.0 mass %, such examples exhibited good permeability μ and specific resistance ρ compared to Comparative example 537 in which the amount of Cr was 2.0 mass %.

Experiment Example 3

The soft magnetic metal powder produced in Experiment example 1 was used together with additives such as a solvent, a binder, and the like to form a slurry, and then a paste was produced. A type of soft magnetic metal powder is shown in Table 7 to Table 10. Then, by using this paste, a green sheet was formed which forms a magnetic element after sintering was performed. An Ag conductor (coil conductor) was formed on the green sheet in a predetermined pattern, and by stacking this in a plurality of layers, a green multilayer body having a thickness of 0.8 mm was produced.

Next, the obtained green multilayer body was cut to obtain a green multilayer coil having a size of 2.0 mm×1.2 mm. A binder removal treatment was carried out to the obtained green multilayer coil under an inert atmosphere ($N_2$ gas atmosphere) at 400° C. Then, for each sample shown in Table 7 to Table 9, a sintered body was obtained by carrying out sintering under a reducing atmosphere (a mixed gas atmosphere of $N_2$ gas and $H_2$ gas (hydrogen concentration of 1.0%)) at 750° C. for 1 hour. For each sample shown in Table 10, a sintered body was obtained by carrying out sintering under the sintering conditions (a sintering temperature, a sintering time, and a sintering atmosphere) as shown in Table 10. A terminal electrode paste was coated to end faces at both side ends of the obtained sintered body and then dried. A baking treatment was carried out under the atmosphere of oxygen partial pressure of 1% at 700° C. for 1 hour to form a terminal electrode to both side end faces, thereby the multilayer coil (product after baking treatment) was obtained.

Next, in the examples and the comparative examples shown in Table 7 to Table 10, the obtained products after baking treatment were subjected to a resin impregnation. Specifically, a raw material mixture of a phenol resin or an epoxy resin was vacuum impregnated, then the resin was heated at 150° C. for 2 hours for curing, thereby the resin was filled. Note that, when the resin was cured, a solvent included in the raw material mixture evaporated. Then, electroplating was performed to form a Ni plating layer and a Sn plating layer on the terminal electrode.

Note that, the raw material mixture of the phenol resin was a mixture made of about 50 wt % of phenol resins $(C_7H_8O \cdot CH_2O \cdot C_4H_{10}O)_x$, about 38 wt % of ethyleneglycol monobutylether, about 11 wt % of 1-butanol, about 0.20 wt % of formaldehyde, and about 0.1% of m-cresol. The raw material mixture of the epoxy resin was a mixture made of a naphthalene-type epoxy resin, a curing agent, a solvent (toluene), and the like.

Also, for the multilayer coil of each example and each comparative example, an inductance L and a Q value were measured using LCR meter (HEWLETT PACKRD:4285A) at f=2 MHz and I=0.1 A. Note that, the inductance L and the Q value shown in Table 7 to Table 10 were average values of inductance L and Q value respectively obtained from 30 multilayer coil.

Regarding the results shown in Table 7, an inductance L of a coil conductor was compared to an inductance L of a Comparative example (Comparative example 102 or 103) made under the same conditions as said coil conductor except that the amount of P of the Comparative example was 50 ppm, and an increase rate of inductance ($\Delta L/L$) was calculated. An increase rate $\Delta L/L$ of 20.0% or more was considered good.

Regarding Comparative examples 111 and 112; and Examples 111 to 113, 111a, and 112a, an inductance L of a sample was compared to an inductance L of Comparative example 111 made under the same conditions as said sample except that the amount of Si was mainly different in Comparative example 111 which was 1.5 mass %. Thereby, an increase rate of inductance $\Delta L/L$ was calculated. An increase rate $\Delta L/L$ of 20.0% or more was considered good.

Regarding Comparative examples 113 to 115; and Examples 114 to 117, 114a, and 116a, an inductance L of a sample was compared to an inductance L of Comparative example 113 made under the same conditions as said sample except that the amount of Co was mainly different in Comparative example 113 which was 1.0 mass %. Thereby, an increase rate of inductance $\Delta L/L$ was calculated. An increase rate $\Delta L/L$ of 20.0% or more was considered good.

Regarding each result of Comparative examples 116 and 117, and Examples 118 and 119, an inductance L of a sample was compared to an inductance L of Comparative example 116 made under the same conditions as said sample except that the amount of Ni was mainly different in Comparative example 116 which was 56.0 mass %, and an increase rate of inductance $\Delta L/L$ was calculated. An increase rate $\Delta L/L$ of 20.0% or more was considered good.

Regarding each result shown in Table 9, an inductance L of a sample was compared to an inductance L of Comparative example 102 made under the same conditions as said sample except that the amount of P of Comparative example 102 was 50 ppm and the type of M of Comparative example 102 was changed. Thereby, an increase rate of inductance $\Delta L/L$ was calculated. The increase rate $\Delta L/L$ of 20.0% or more was considered good.

Examples 121 to 126 shown in Table 10 were each obtained by changing the sintering conditions of Example 116 shown in Table 8. The increase rates ($\Delta L/L$) of Examples 121 to 126 in Table 10 each show a rate of increase of the inductance L with respect to an inductance L of Comparative example 113 which was also shown in Table 8. An increase rate $\Delta L/L$ of 20.0% or more was considered good.

The Q value of 40.0 or higher was considered good.

For the multilayer coil of each example and each comparative example, the plating elongation was evaluated. The plating elongation was evaluated by observing the outer appearance of the multilayer coil. In Table 7 to Table 10, the plating elongation was evaluated from "A" to "D". When no plating elongation was observed, it was evaluated "A". When 50 μm or less of the plating elongation was observed, then it was evaluated "B". When the plating elongation was more than 50 μm and less than 400 μm, then it was evaluated "C". When 400 μm or more of plating elongation was observed, it was evaluated "D". In Experiment examples 3 and 4 which are described in below, when the evaluation of plating elongation was "A" or "B", it was considered good, and when the evaluation was "A", it was considered especially good.

For the multilayer coil of each example and comparative example, a short circuit rate was measured. For each sample, 30 multilayer coils were produced. Then, a LCR meter was used to verify whether short circuit had occurred in 30 multilayer coils, and the number of multilayer coils with short circuit were counted, thereby a short circuit rate was calculated. A short circuit rate of 3% or less, that is 0/30, was considered good.

For each multilayer coil shown in Table 10, an average thickness of the coating films was measured. For measuring the average thickness of the coating films, a cross section of an area of 7 μm×7 μm in the conductor interspace was observed under a magnification of 20000× using STEM-EDS, and also an area of 0.3 μm×0.3 μm was observed under a magnification of 500000× using STEM-EDS. These two observations were combined accordingly in order to measure the average thickness of the coating films. Specifically, the thicknesses of the coating films of at least 50 soft magnetic metal particles 11 in the cross section of the conductor interspace were measured using STEM-EDS, and an average thereof was obtained.

TABLE 7

| | Soft magnetic metal powder | | | | | | | Multilayer coil | | | | | |
|---|---|---|---|---|---|---|---|---|---|---|---|---|---|
| | (mass %) | | | | (ppm) | (μm) | | | Impregnated | (μH) | (%) | | Plating | Short circuit |
| Sample No. | Fe | Ni | Si | Co | P | D50 | Sample No. | resin | L | ΔL/L | Q value | elongation | rate |
| Comparative example 1 | 49.0 | 42.0 | 3.0 | 6.0 | 50 | 5.0 | Comparative example 102 | Phenol | 0.420 | 0 | 32.0 | B | 0/30 |
| | 49.0 | 42.0 | 3.0 | 6.0 | 50 | 5.0 | Comparative example 103 | Epoxy | 0.420 | 0 | 31.5 | B | 0/30 |
| Example 1 | 49.0 | 42.0 | 3.0 | 6.0 | 100 | 5.0 | Example 101 | Phenol | 0.523 | 24.5 | 43.0 | A | 0/30 |
| | 49.0 | 42.0 | 3.0 | 6.0 | 100 | 5.0 | Example 102 | Epoxy | 0.528 | 25.7 | 44.2 | A | 0/30 |
| Example 1a | 49.0 | 42.0 | 3.0 | 6.0 | 300 | 5.0 | Example 101a | Phenol | 0.552 | 31.4 | 47.0 | A | 0/30 |
| | 49.0 | 42.0 | 3.0 | 6.0 | 300 | 5.0 | Example 102a | Epoxy | 0.554 | 31.9 | 47.5 | A | 0/30 |
| Example 2 | 49.0 | 42.0 | 3.0 | 6.0 | 500 | 5.0 | Example 103 | Phenol | 0.580 | 38.1 | 50.0 | A | 0/30 |
| | 49.0 | 42.0 | 3.0 | 6.0 | 500 | 5.0 | Example 104 | Epoxy | 0.578 | 37.6 | 49.3 | A | 0/30 |
| Example 3 | 49.0 | 42.0 | 3.0 | 6.0 | 2000 | 5.0 | Example 105 | Phenol | 0.563 | 34.0 | 47.0 | A | 0/30 |
| | 49.0 | 42.0 | 3.0 | 6.0 | 2000 | 5.0 | Example 106 | Epoxy | 0.565 | 34.5 | 47.8 | A | 0/30 |

TABLE 7-continued

| | Soft magnetic metal powder | | | | | | Multilayer coil | | | | | | |
|---|---|---|---|---|---|---|---|---|---|---|---|---|---|
| | (mass %) | | | | (ppm) | (μm) | | Impregnated | (μH) | (%) | | Plating | Short circuit |
| Sample No. | Fe | Ni | Si | Co | P | D50 | Sample No. | resin | L | ΔL/L | Q value | elongation | rate |
| Example 4 | 49.0 | 42.0 | 3.0 | 6.0 | 5000 | 5.0 | Example 107 | Phenol | 0.525 | 25.0 | 44.5 | A | 0/30 |
| | 49.0 | 42.0 | 3.0 | 6.0 | 5000 | 5.0 | Example 108 | Epoxy | 0.521 | 24.0 | 44.2 | A | 0/30 |
| Comparative example 2 | 49.0 | 42.0 | 3.0 | 6.0 | 6000 | 5.0 | Comparative example 109 | Phenol | 0.473 | 12.6 | 37.0 | B | 0/30 |
| | 49.0 | 42.0 | 3.0 | 6.0 | 6000 | 5.0 | Comparative example 110 | Epoxy | 0.471 | 12.1 | 37.5 | B | 0/30 |

TABLE 8

| | Soft magnetic metal powder | | | | | | Multilayer coil | | | | | | |
|---|---|---|---|---|---|---|---|---|---|---|---|---|---|
| | (mass %) | | | | (ppm) | (μm) | | Impregnated | (μH) | (%) | | Plating | Short circuit |
| Sample No. | Fe | Ni | Si | Co | P | D50 | Sample No. | resin | L | ΔL/L | Q value | elongation | rate |
| Comparative example 3 | 50.5 | 45.0 | 1.5 | 3.0 | 500 | 5.0 | Comparative example 111 | Phenol | 0.412 | 0 | 30.5 | D | 10/30 |
| Example 5 | 50.5 | 44.5 | 2.0 | 3.0 | 500 | 5.0 | Example 111 | Phenol | 0.513 | 24.5 | 41.3 | A | 0/30 |
| Example 5a | 50.5 | 44.0 | 2.5 | 3.0 | 500 | 5.0 | Example 111a | Phenol | 0.541 | 31.3 | 43.5 | A | 0/30 |
| Example 2 | 49.0 | 42.0 | 3.0 | 6.0 | 500 | 5.0 | Example 112 | Phenol | 0.580 | 40.8 | 50.0 | A | 0/30 |
| Example 6a | 47.5 | 41.0 | 5.5 | 6.0 | 500 | 5.0 | Example 112a | Phenol | 0.538 | 30.6 | 50.5 | A | 0/30 |
| Example 6 | 47.0 | 41.0 | 6.0 | 6.0 | 500 | 5.0 | Example 113 | Phenol | 0.523 | 26.9 | 51.2 | A | 0/30 |
| Comparative example 4 | 46.5 | 40.5 | 7.0 | 6.0 | 500 | 5.0 | Comparative example 112 | Phenol | 0.432 | 4.9 | 45.5 | A | 0/30 |
| Comparative example 5 | 51.0 | 44.5 | 3.0 | 1.0 | 500 | 5.0 | Comparative example 113 | Phenol | 0.415 | 0 | 38.0 | A | 0/30 |
| Example 7 | 50.5 | 44.5 | 3.0 | 2.0 | 500 | 5.0 | Example 114 | Phenol | 0.550 | 32.5 | 47.8 | A | 0/30 |
| Example 7a | 49.5 | 42.5 | 3.0 | 5.0 | 500 | 5.0 | Example 114a | Phenol | 0.570 | 37.3 | 50.0 | A | 0/30 |
| Example 2 | 49.0 | 42.0 | 3.0 | 6.0 | 500 | 5.0 | Example 112 | Phenol | 0.580 | 40.8 | 50.0 | A | 0/30 |
| Example 8 | 45.0 | 32.0 | 3.0 | 20.0 | 500 | 5.0 | Example 115 | Phenol | 0.597 | 43.9 | 50.2 | A | 0/30 |
| Example 9 | 43.0 | 24.0 | 3.0 | 30.0 | 500 | 5.0 | Example 116 | Phenol | 0.605 | 45.8 | 51.2 | A | 0/30 |
| Example 9a | 43.0 | 22.0 | 3.0 | 32.0 | 500 | 5.0 | Example 116a | Phenol | 0.582 | 40.2 | 50.0 | A | 0/30 |
| Example 10 | 37.0 | 20.0 | 3.0 | 40.0 | 500 | 5.0 | Example 117 | Phenol | 0.523 | 26.0 | 48.2 | A | 0/30 |
| Comparative example 6a | 41.5 | 15.0 | 3.0 | 40.5 | 500 | 5.0 | Comparative example 114 | Phenol | 0.442 | 6.5 | 42.5 | A | 0/30 |
| Comparative example 6 | 43.5 | 13.0 | 3.0 | 40.5 | 500 | 5.0 | Comparative example 115 | Phenol | 0.450 | 8.4 | 43.2 | A | 0/30 |
| Comparative example 7 | 40.0 | 56.0 | 2.0 | 2.0 | 500 | 5.0 | Comparative example 116 | Phenol | 0.420 | 0 | 31.2 | B | 0/30 |
| Example 11 | 40.0 | 56.0 | 3.0 | 2.0 | 500 | 5.0 | Example 118 | Phenol | 0.572 | 36.2 | 48.0 | A | 0/30 |
| Example 12 | 39.0 | 15.0 | 6.0 | 40.0 | 500 | 5.0 | Example 119 | Phenol | 0.535 | 27.4 | 50.5 | A | 0/30 |
| Comparative example 7a | 39.5 | 14.5 | 6.0 | 40.0 | 500 | 5.0 | Comparative example 117 | Phenol | 0.453 | 7.9 | 43.6 | A | 0/30 |

TABLE 9

| | Soft magnetic metal powder | | | Multilayer coil | | | | | | |
|---|---|---|---|---|---|---|---|---|---|---|
| | | (ppm) | (μm) | | Impregnated | (μH) | (%) | | Plating | Short circuit |
| Sample No. | M | P | D50 | Sample No. | resin | L | ΔL/L | Q value | elongation | rate |
| Comparative example 1 | Co | 50 | 5.0 | Comparative example 102 | Phenol | 0.420 | 0 | 32.0 | B | 0/30 |
| Example 2 | Co | 500 | 5.0 | Example 103 | Phenol | 0.580 | 38.1 | 50.0 | A | 0/30 |
| Example 2b | B | 500 | 5.0 | Example 103b | Phenol | 0.510 | 21.6 | 40.8 | A | 0/30 |
| Example 2c | Mn | 500 | 5.0 | Example 103c | Phenol | 0.533 | 27.0 | 42.7 | A | 0/30 |
| Example 2d | Ti | 500 | 5.0 | Example 103d | Phenol | 0.523 | 24.6 | 41.9 | A | 0/30 |
| Example 2e | Zr | 500 | 5.0 | Example 103e | Phenol | 0.518 | 23.4 | 41.5 | A | 0/30 |
| Example 2f | Hf | 500 | 5.0 | Example 103f | Phenol | 0.511 | 21.9 | 40.9 | A | 0/30 |
| Example 2g | Nb | 500 | 5.0 | Example 103g | Phenol | 0.519 | 23.7 | 41.6 | A | 0/30 |
| Example 2h | Ta | 500 | 5.0 | Example 103h | Phenol | 0.511 | 21.6 | 40.8 | A | 0/30 |
| Example 2i | Mo | 500 | 5.0 | Example 103i | Phenol | 0.552 | 31.5 | 44.2 | A | 0/30 |

TABLE 9-continued

| Sample No. | Soft magnetic metal powder M | (ppm) P | (μm) D50 | Sample No. | Impregnated resin | (μH) L | (%) ΔL/L | Q value | Plating elongation | Short circuit rate |
|---|---|---|---|---|---|---|---|---|---|---|
| Example 2j | Mg | 500 | 5.0 | Example 103j | Phenol | 0.514 | 22.5 | 41.1 | A | 0/30 |
| Example 2k | Ca | 500 | 5.0 | Example 103k | Phenol | 0.517 | 23.1 | 41.4 | A | 0/30 |
| Example 2l | Sr | 500 | 5.0 | Example 103l | Phenol | 0.512 | 21.9 | 40.9 | A | 0/30 |
| Example 2m | Ba | 500 | 5.0 | Example 103m | Phenol | 0.512 | 21.9 | 40.9 | A | 0/30 |
| Example 2n | Zn | 500 | 5.0 | Example 103n | Phenol | 0.523 | 24.6 | 41.9 | A | 0/30 |
| Example 2o | Al | 500 | 5.0 | Example 103o | Phenol | 0.552 | 31.5 | 44.2 | A | 0/30 |
| Example 2p | Nd | 500 | 5.0 | Example 103p | Phenol | 0.513 | 22.2 | 41.0 | A | 0/30 |
| Comparative Example 2 | Co | 6000 | 5.0 | Comparative Example 109 | Phenol | 0.473 | 12.6 | 37.0 | B | 0/30 |

TABLE 10

| Soft magnetic metal powder Sample No. | Sintering conditions Temp., Time, and Atmosphere | Sintered body μ | (%) Δμ/μ | (Ω·m) ρ | Multilayer coil Sample No. |
|---|---|---|---|---|---|
| Comparative example 5 | 750° C. 1 h, 99% $N_2$ + 1% $H_2$ | 32.3 | 0 | 3E06 | Comparative example 113 |
| Example 9 | 750° C. 30 min, 96% $N_2$ + 4.0% $H_2$ | 52.0 | 61.0 | 1E07 | Example 121 |
| | 750° C. 35 min, 97% $N_2$ + 3.0% $H_2$ | 50.3 | 55.7 | 2E07 | Example 122 |
| | 750° C. 40 min, 98% $N_2$ + 2.0% $H_2$ | 48.1 | 48.9 | 2E07 | Example 123 |
| | 750° C. 50 min, 98.5% $N_2$ + 1.5% $H_2$ | 47.3 | 46.4 | 3E07 | Example 124 |
| | 750° C. 1 h, 99% $N_2$ + 1% $H_2$ | 45.5 | 40.9 | 3E07 | Example 116 |
| | 750° C. 1 h 30 min, 99.5% $N_2$ + 0.5% $H_2$ | 44.1 | 36.5 | 4E07 | Example 125 |
| | 750° C. 3 h, 99.5% $N_2$ + 0.5% $H_2$ | 41.5 | 20.7 | 5E07 | Example 126 |

| Soft magnetic metal powder Sample No. | Impregnated resin | (μ/H) L | (%) ΔL/L | Q value | Plating elongation | Short circuit rate | (nm) Coating film average thickness |
|---|---|---|---|---|---|---|---|
| Comparative example 5 | Phenol | 0.415 | 0 | 38.0 | A | 0/30 | 40 |
| Example 9 | Phenol | 0.630 | 51.8 | 50.0 | B | 0/30 | 3.0 |
| | Phenol | 0.624 | 50.4 | 53.0 | A | 0/30 | 5.0 |
| | Phenol | 0.611 | 47.2 | 52.5 | A | 0/30 | 11 |
| | Phenol | 0.606 | 46.0 | 51.8 | A | 0/30 | 22 |
| | Phenol | 0.605 | 45.8 | 51.2 | A | 0/30 | 40 |
| | Phenol | 0.597 | 43.9 | 50.0 | A | 0/30 | 60 |
| | Phenol | 0.570 | 37.3 | 48.0 | A | 0/30 | 101 |

According to Table 7 and Table 9, the multilayer coils produced using the soft magnetic powders of Comparative example 1 and Comparative example 2 did not exhibit good inductance L or Q value. Further, the results of plating elongation were worse than that of examples shown in Table 7 and Table 9.

According to Examples 111 to 119, 111a, 112a, 114a, 116a, and Comparative examples 111 to 117 shown in Table 8, when the multilayer coils were produced using the soft magnetic metal powders of Comparative examples 3 to 7, 6a, and 7a, the inductance L and/or the Q value decreased compared to the multilayer coils produced by using the soft magnetic metal powders of Examples 2 to 12, 5a, 6a, 7a, and 9a. Further, when the soft magnetic metal powder of Comparative example 3 of which the amount of Si was too small was used, results of both plating elongation and short circuit rate were bad.

According to Examples 116, 121 to 126 of Table 10, the permeability μ and the specific resistance ρ tended to decrease as the sintering time became shorter and the hydrogen concentration in the sintering atmosphere increased.

Note that, the average thickness of the coating films of the examples shown in Table 7 to Table 9 were about 40 nm or so.

Experiment Example 4

Regarding the multilayer coils of Example 103 and Example 104, the presence of the resin which filled the space between the conductor interspace was verified. Specifically, in order to observe the conductor interspace, a cross section image of an area of 13 μm×10 μm in the conductor interspace was taken using SEM at magnification of 10000×. FIG. 3 shows an SEM image of the conductor interspace of the multilayer coil of Example 103, and FIG. 4 shows an SEM image of the conductor interspace of the multilayer coil of Example 104. In both cases of Example 103 and Example 104, the space of the conductor interspace was filled with the resin.

Further, an area of 7 μm×7 μm of the multilayer coil of Example 103 was observed using STEM-EDS at magnification of 20000× which was at higher magnification than the above-mentioned observation. Further, an area of 0.3 μm×0.3 μm of the multilayer coil of Example 103 was observed using STEM-EDS at magnification of 500000×. Results are shown in FIG. 5 to FIG. 12. FIG. 5 shows a BF image at magnification of 20000×. FIG. 6 shows a BF image at magnification of 500000×. FIG. 7 shows a C mapping image at magnification of 20000×. FIG. 8 shows a C mapping image at magnification of 500000×. FIG. 9 shows a Si mapping image at magnification of 20000×. FIG. 10 shows a Si mapping image at magnification of 500000×. FIG. 11 shows an O mapping image at magnification of 20000×. FIG. 12 is an O mapping image at magnification of 500000×.

According to these images, it was confirmed that the soft magnetic metal particle core was covered with an oxide coating film which is one type of coating film, and also it was confirmed that in the coating film, a layer which was in contact with the soft magnetic metal particle core was made of Si or oxides including Si. Further, Si was substantially only included in the soft magnetic metal particle core and the coating film, and C was substantially only included in the resin which filled the space. Also, all of the examples shown in Table 7 to Table 9 had an average thickness of the coating films within a range of 5 nm or more and 60 nm or less.

Experiment Example 5

The soft magnetic metal powder produced in Experiment example 2 was used together with additives such as a solvent, a binder, and the like to form a slurry, and a paste was produced. Hereinafter, a multilayer coil was produced as same as in Experiment example 3. As for sintering conditions of samples shown in Table 11 to Table 13, sintering was performed under a reducing atmosphere (a mixed gas atmosphere of $N_2$ gas and $H_2$ gas (hydrogen concentration of 1.0%)) at 750° C. for 1 hour, thereby a sintered body was obtained. A sintering temperature, a sintering time, and a sintering atmosphere of samples shown in Table 14 were as shown in Table 14, thereby a sintered body was obtained. The Q value of the multilayer coil of 40.0 or more was considered good.

Also, for each multilayer coil of Table 11 to Table 14, the coating film was observed as similar to the multilayer coils shown in Table 10. Further, D1 and D2 were measured and D2/D1 was calculated. Note that, for all examples shown in Table 11 to Table 14, it was confirmed that the amount of Si was larger in the first layer and the amount of Fe was smaller in the first layer than in the soft magnetic metal particle core; and also it was confirmed that the amounts of Si, Cr, and Ni were larger in the second layer and the amount of Fe was smaller in the second layer than in the soft magnetic metal particle core (except for Examples 116 and 116c).

In Experiment example 5, an inductance L of a sample having Cr in an amount of less than 2.0 mass % was compared to an inductance L of a comparative example (Comparative example 601 or 602) which used the same resin as said sample and contained 2.0 mass % of Cr, and an increase rate of inductance L (ΔL/L) was calculated.

TABLE 11

| Sample No. | Soft magnetic metal powder (mass %) | | | | | | (ppm) | (μm) | Multilayer coil | Impregnated |
|---|---|---|---|---|---|---|---|---|---|---|
| | Fe | Ni | Si | Co | Cr | P | D50 | Sample No. | resin |
| Comparative example 537 | 41.0 | 24.0 | 3.0 | 30.0 | 2.0 | 500 | 5.0 | Comparative example 601 | Phenol |
| | 41.0 | 24.0 | 3.0 | 30.0 | 2.0 | 500 | 5.0 | Comparative example 602 | Epoxy |
| Example 538 | 41.2 | 24.0 | 3.0 | 30.0 | 1.8 | 500 | 5.0 | Example 602 | Phenol |
| | 41.2 | 24.0 | 3.0 | 30.0 | 1.8 | 500 | 5.0 | Example 603 | Epoxy |
| Example 539 | 41.5 | 24.0 | 3.0 | 30.0 | 1.5 | 500 | 5.0 | Example 605 | Phenol |
| | 41.5 | 24.0 | 3.0 | 30.0 | 1.5 | 500 | 5.0 | Example 606 | Epoxy |
| Example 540 | 42.0 | 24.0 | 3.0 | 30.0 | 1.0 | 500 | 5.0 | Example 608 | Phenol |
| | 42.0 | 24.0 | 3.0 | 30.0 | 1.0 | 500 | 5.0 | Example 609 | Epoxy |
| Example 541 | 42.5 | 24.0 | 3.0 | 30.0 | 0.5 | 500 | 5.0 | Example 611 | Phenol |
| | 42.5 | 24.0 | 3.0 | 30.0 | 0.5 | 500 | 5.0 | Example 612 | Epoxy |
| Example 542 | 42.9 | 24.0 | 3.0 | 30.0 | 0.1 | 500 | 5.0 | Example 614 | Phenol |
| | 42.9 | 24.0 | 3.0 | 30.0 | 0.1 | 500 | 5.0 | Example 615 | Epoxy |
| Example 9 | 43.0 | 24.0 | 3.0 | 30.0 | 0.0 | 500 | 5.0 | Example 116 | Phenol |
| | 43.0 | 24.0 | 3.0 | 30.0 | 0.0 | 500 | 5.0 | Example 116c | Epoxy |

| Soft magnetic metal powder Sample No. | Multilayer coil | | | | | | | |
|---|---|---|---|---|---|---|---|---|
| | (μH) L | (%) ΔL/L | Q value | Plating elongation | Short circuit rate | (nm) D1 | (nm) D2 | D2/D1 |
| Comparative example 537 | 0.500 | 0 | 39.7 | A | 0/30 | 19 | 51 | 2.7 |
| | 0.501 | 0 | 39.5 | A | 0/30 | 20 | 49 | 2.5 |
| Example 538 | 0.611 | 22.2 | 52.0 | A | 0/30 | 20 | 30 | 1.5 |
| | 0.609 | 21.6 | 51.9 | A | 0/30 | 21 | 30 | 1.4 |
| Example 539 | 0.621 | 24.2 | 52.6 | A | 0/30 | 20 | 26 | 1.3 |
| | 0.620 | 23.8 | 52.5 | A | 0/30 | 21 | 26 | 1.2 |
| Example 540 | 0.630 | 26.0 | 53.1 | A | 0/30 | 19 | 20 | 1.1 |
| | 0.630 | 25.7 | 53.2 | A | 0/30 | 20 | 19 | 1.0 |
| Example 541 | 0.620 | 24.0 | 52.5 | A | 0/30 | 25 | 20 | 0.8 |
| | 0.621 | 24.0 | 52.5 | A | 0/30 | 25 | 19 | 0.8 |
| Example 542 | 0.609 | 21.8 | 52.0 | A | 0/30 | 34 | 18 | 0.5 |
| | 0.610 | 21.8 | 52.1 | A | 0/30 | 34 | 17 | 0.5 |
| Example 9 | 0.605 | 21.0 | 51.2 | A | 0/30 | 40 | 0 | 0.0 |
| | 0.603 | 20.4 | 51.1 | A | 0/30 | 40 | 0 | 0.0 |

TABLE 12

| Sample No. | Soft magnetic metal powder | | | | | | Multilayer coil | |
|---|---|---|---|---|---|---|---|---|
| | (mass %) | | | | | (ppm) | (μm) | | Impregnated |
| | Fe | Ni | Si | Co | Cr | P | D50 | Sample No. | resin |
| Comparative | 41.0 | 24.0 | 3.0 | 30.0 | 2.0 | 500 | 5.0 | Comparative Example 601 | Phenol |
| example 537 | 41.0 | 24.0 | 3.0 | 30.0 | 2.0 | 500 | 5.0 | Comparative example 602 | Epoxy |
| Example 543 | 43.0 | 24.0 | 2.0 | 30.0 | 1.0 | 500 | 5.0 | Example 621 | Phenol |
| | 43.0 | 24.0 | 2.0 | 30.0 | 1.0 | 500 | 5.0 | Example 622 | Epoxy |
| Example 544 | 42.5 | 24.0 | 2.5 | 30.0 | 1.0 | 500 | 5.0 | Example 623 | Phenol |
| | 42.5 | 24.0 | 2.5 | 30.0 | 1.0 | 500 | 5.0 | Example 624 | Epoxy |
| Example 540 | 42.0 | 24.0 | 3.0 | 30.0 | 1.0 | 500 | 5.0 | Example 608 | Phenol |
| | 42.0 | 24.0 | 3.0 | 30.0 | 1.0 | 500 | 5.0 | Example 609 | Epoxy |
| Example 544a | 41.5 | 23.5 | 4.0 | 30.0 | 1.0 | 500 | 5.0 | Example 623a | Phenol |
| | 41.5 | 23.5 | 4.0 | 30.0 | 1.0 | 500 | 5.0 | Example 624a | Epoxy |
| Example 545 | 40.5 | 23.0 | 5.5 | 30.0 | 1.0 | 500 | 5.0 | Example 625 | Phenol |
| | 40.5 | 23.0 | 5.5 | 30.0 | 1.0 | 500 | 5.0 | Example 626 | Epoxy |
| Example 546 | 40.0 | 23.0 | 6.0 | 30.0 | 1.0 | 500 | 5.0 | Example 627 | Phenol |
| | 40.0 | 23.0 | 6.0 | 30.0 | 1.0 | 500 | 5.0 | Example 628 | Epoxy |

| Soft magnetic metal powder Sample No. | Multilayer coil | | | | | | |
|---|---|---|---|---|---|---|---|
| | (μH) L | Q value | Plating elongation | Short circuit rate | (nm) D1 | (nm) D2 | D2/D1 |
| Comparative | 0.500 | 39.7 | A | 0/30 | 19 | 51 | 2.7 |
| example 537 | 0.501 | 39.5 | A | 0/30 | 20 | 49 | 2.5 |
| Example 543 | 0.611 | 52.1 | A | 0/30 | 17 | 25 | 1.5 |
| | 0.612 | 52.2 | A | 0/30 | 17 | 25 | 1.5 |
| Example 544 | 0.612 | 52.2 | A | 0/30 | 18 | 24 | 1.3 |
| | 0.613 | 52.3 | A | 0/30 | 18 | 23 | 1.3 |
| Example 540 | 0.630 | 53.1 | A | 0/30 | 19 | 20 | 1.1 |
| | 0.630 | 53.2 | A | 0/30 | 20 | 19 | 1.0 |
| Example 544a | 0.610 | 52.5 | A | 0/30 | 24 | 20 | 0.8 |
| | 0.612 | 52.6 | A | 0/30 | 25 | 19 | 0.8 |
| Example 545 | 0.584 | 51.7 | A | 0/30 | 28 | 19 | 0.7 |
| | 0.586 | 51.6 | A | 0/30 | 29 | 19 | 0.7 |
| Example 546 | 0.570 | 50.9 | A | 0/30 | 33 | 18 | 0.5 |
| | 0.571 | 50.8 | A | 0/30 | 34 | 17 | 0.5 |

TABLE 13

| Sample No. | Soft magnetic metal powder | | | Multilayer coil | | | | | |
|---|---|---|---|---|---|---|---|---|---|
| | M | (mass %) Cr | (μm) D50 | Sample No. | Impregnated resin | (μH) L | Q value | Plating elongation | Short circuit rate |
| Comparative Example 537 | Co | 2.0 | 5.0 | Comparative Example 601 | Phenol | 0.500 | 39.7 | A | 0/30 |
| Example 540 | Co | 1.0 | 5.0 | Example 608 | Phenol | 0.630 | 53.1 | A | 0/30 |
| Example 540b | B | 1.0 | 5.0 | Example 608b | Phenol | 0.606 | 50.2 | A | 0/30 |
| Example 540c | Mn | 1.0 | 5.0 | Example 608c | Phenol | 0.623 | 51.6 | A | 0/30 |
| Example 540d | Ti | 1.0 | 5.0 | Example 608d | Phenol | 0.615 | 50.9 | A | 0/30 |
| Example 540e | Zr | 1.0 | 5.0 | Example 608e | Phenol | 0.608 | 50.3 | A | 0/30 |
| Example 540f | Hf | 1.0 | 5.0 | Example 608f | Phenol | 0.607 | 50.3 | A | 0/30 |
| Example 540g | Nb | 1.0 | 5.0 | Example 608g | Phenol | 0.608 | 50.3 | A | 0/30 |
| Example 540h | Ta | 1.0 | 5.0 | Example 608h | Phenol | 0.599 | 49.6 | A | 0/30 |
| Example 540i | Mo | 1.0 | 5.0 | Example 608i | Phenol | 0.641 | 51.9 | A | 0/30 |
| Example 540j | Mg | 1.0 | 5.0 | Example 608j | Phenol | 0.606 | 50.2 | A | 0/30 |
| Example 540k | Ca | 1.0 | 5.0 | Example 608k | Phenol | 0.608 | 50.3 | A | 0/30 |
| Example 540l | Sr | 1.0 | 5.0 | Example 608l | Phenol | 0.607 | 50.3 | A | 0/30 |
| Example 540m | Ba | 1.0 | 5.0 | Example 608m | Phenol | 0.606 | 50.2 | A | 0/30 |
| Example 540n | Zn | 1.0 | 5.0 | Example 608n | Phenol | 0.614 | 50.8 | A | 0/30 |
| Example 540o | Al | 1.0 | 5.0 | Example 608o | Phenol | 0.645 | 52.2 | A | 0/30 |
| Example 540p | Nd | 1.0 | 5.0 | Example 608p | Phenol | 0.606 | 50.2 | A | 0/30 |

TABLE 14

| Soft magnetic metal powder Sample No. | Sintering conditions Temp., Time, and Atmosphere | Sintered body μ | (Ω·m) ρ | Multilayer coil Sample No. | Impregnated resin |
|---|---|---|---|---|---|
| Comparative Example 537 | 750° C. 1 h, 99% N$_2$ + 1% H$_2$ | 39.0 | 7E07 | Comparative example 601 | Phenol |
| Example 540 | 750° C. 30 min, 96% N$_2$ + 4.0% H$_2$ | 59.2 | 4E07 | Example 631 | Phenol |
|  | 750° C. 35 min, 97% N$_2$ + 3.0% H$_2$ | 57.9 | 4E07 | Example 632 | Phenol |
|  | 750° C. 40 min, 98% N$_2$ + 2.0% H$_2$ | 55.8 | 5E07 | Example 633 | Phenol |
|  | 750° C. 50 min, 98.5% N$_2$ + 1.5% H$_2$ | 53.2 | 5E07 | Example 634 | Phenol |
|  | 750° C. 1 h, 99% N$_2$ + 1% H$_2$ | 52.0 | 5E07 | Example 608 | Phenol |
|  | 750° C. 1 h 30 min, 99.5% N$_2$ + 0.5% H$_2$ | 50.0 | 6E07 | Example 635 | Phenol |
|  | 750° C. 3 h, 99.5% N$_2$ + 0.5% H$_2$ | 49.0 | 6E07 | Example 636 | Phenol |
|  | 550° C. 1 h, 96.5% N$_2$ + 3.5% H$_2$ | 58.5 | 4E07 | Example 637 | Phenol |
|  | 600° C. 1 h, 96.5% N$_2$ + 3.5% H$_2$ | 58.1 | 4E07 | Example 638 | Phenol |
|  | 750° C. 1 h, 99% N$_2$ + 1% H$_2$ | 52.0 | 5E07 | Example 608 | Phenol |
|  | 800° C. 1 h, 99.5% N$_2$ + 0.5% H$_2$ | 49.9 | 6E07 | Example 639 | Phenol |
|  | 850° C. 1 h, 99.9% N$_2$ + 0.1% H$_2$ | 47.2 | 6E07 | Example 640 | Phenol |

| Soft magnetic metal powder Sample No. | Multilayer coil (μH) L | (%) ΔL/L | Q value | Plating elongation | Short circuit rate | (nm) D1 | (nm) D2 | D2/D1 |
|---|---|---|---|---|---|---|---|---|
| Comparative Example 537 | 0.500 | 0 | 39.7 | A | 0/30 | 19 | 51 | 2.7 |
| Example 540 | 0.682 | 36.4 | 53.9 | A | 0/30 | 2.5 | 2.5 | 1.0 |
|  | 0.670 | 34.0 | 53.6 | A | 0/30 | 4.5 | 5.0 | 1.1 |
|  | 0.655 | 31.0 | 53.5 | A | 0/30 | 9.0 | 10 | 1.1 |
|  | 0.642 | 28.4 | 53.3 | A | 0/30 | 14 | 15 | 1.1 |
|  | 0.630 | 26.0 | 53.1 | A | 0/30 | 18 | 19 | 1.1 |
|  | 0.625 | 25.0 | 52.7 | A | 0/30 | 25 | 24 | 1.0 |
|  | 0.613 | 22.6 | 51.7 | A | 0/30 | 30 | 30 | 1.0 |
|  | 0.678 | 35.6 | 53.8 | A | 0/30 | 5.0 | 1.5 | 0.3 |
|  | 0.673 | 34.6 | 53.7 | A | 0/30 | 5.5 | 2.5 | 0.5 |
|  | 0.630 | 26.0 | 53.1 | A | 0/30 | 18 | 19 | 1.1 |
|  | 0.621 | 24.2 | 52.2 | A | 0/30 | 20 | 30 | 1.5 |
|  | 0.605 | 21.0 | 51.0 | A | 0/30 | 22 | 40 | 1.8 |

According to Table 11 to Table 13, the multilayer coil produced using the soft magnetic metal powder of Comparative example 537 did not show suitable inductance L and Q value. Also, the multilayer coils of Examples 116 and 116c produced using the soft magnetic metal powder of Example 9 which did not include Cr had a coating film constituted only by the first layer. Further, compared to other examples produced under the same conditions except for the amount of Fe and the amount of Cr, Examples 116 and 116c showed decreased Q value.

According to Table 12, when the amount of Cr was the same, as the amount of Si increased, D1 tended to increase and D2 tended to decrease.

According to Examples 608 and 631 to 638 of Table 14, the permeability μ tended to increase and the specific resistance ρ tended to decrease as the sintering time became shorter and the hydrogen concentration in the sintering atmosphere increased. Also, the inductance L tended to increase and the coating film tended to be thinner. Also, according to Examples 608 and 637 to 640, as the sintering temperature increased and the hydrogen concentration of the sintering atmosphere decreased, the permeability μ tended to decrease and the specific resistance ρ tended to increase. Further, the inductance L of the multilayer coil tended to decrease, the coating film tended to be thicker, and D2/D1 tended to increase.

NUMERICAL REFERENCES

1 . . . Multilayer coil
2 . . . Element body
2a . . . Surface part
2b . . . Middle part
3 . . . Terminal electrode
4 . . . Magnetic element
4a . . . Conductor interspace
5 . . . Coil conductor
5a, 5b . . . Lead electrode
11 . . . Soft magnetic metal particle
11a . . . Soft magnetic metal particle core
11b . . . Oxide coating film
12 . . . Space
13 . . . Resin
14 . . . Void

What is claimed is:

1. A soft magnetic metal powder comprising soft magnetic metal particles each constituted by a Fe—Ni—Si-M based alloy, wherein
the Fe—Ni—Si-M based alloy further includes P;
M is one or more selected from B, Co, Mn, Ti, Zr, Hf, Nb, Ta, Mo, Mg, Ca, Sr, Ba, Zn and rare earth elements; and
the Fe—Ni—Si-M based alloy includes 15.0 mass % or more and 55.0 mass % or less of Ni, 2.0 mass % or more and 6.0 mass % or less of Si, 2.0 mass % or more and 40.0 mass % or less of M, and 100 ppm or more and 5000 ppm or less of P with respect to 100 mass % of a total amount of Fe, Ni, Si, and M.

2. The soft magnetic metal powder according to claim 1, wherein M is Co.

3. The soft magnetic metal powder according to claim 1, wherein an average particle size (D50) of the soft magnetic metal powder is 1.5 μm or more and 15.0 μm or less.

4. A soft magnetic sintered body comprising the soft magnetic metal powder according to claim 1.

5. A coil type electronic component comprising a magnetic element and a coil conductor embedded in the magnetic element, wherein
the magnetic element comprises the soft magnetic metal sintered body according to claim 4.

6. The coil type electronic component according to claim 5, wherein the soft magnetic metal particles are each covered with a coating film, and
the coating film has a layer including Si or oxides of Si contacting the soft magnetic particle.

7. The coil type electronic component according to claim 6, wherein the layer of the coating film contacting the soft magnetic metal particle further includes P.

8. The coil type electronic component according to claim 6, wherein an average thickness of the coating film is within a range of 5 nm or more and 60 nm or less.

9. The coil type electronic component according to claim 5, wherein the magnetic element includes the soft magnetic metal particles and a resin; and
a space formed between the soft magnetic metal particles are filled with the resin.

10. The coil type electronic component according to claim 9, wherein the resin is a phenol resin or an epoxy resin.

11. A soft magnetic metal powder comprising soft magnetic metal particles each constituted by a Fe—Ni based alloy, wherein
the Fe—Ni based alloy further includes Cr;
the Fe—Ni based alloy further includes Si and Co;
the Fe—Ni based alloy includes 15.0 mass % or more and 80.0 mass % or less of Ni, 0.5 mass % or more and 1.5 mass % or less of Cr, and 1.0 mass % or more and 50.0 mass % or less of Co, 1.0 mass % or more and 6.0 mass % or less of Si, 0.5 mass % or less of O, 100 ppm or more and 5000 ppm or less of P, and 0.15 mass % or less of elements other than Fe, Ni, Si, Co, Cr, P and O with respect to 100 mass % of a total amount of Fe, Ni, Si, Co, and Cr.

12. The soft magnetic metal powder according to claim 11, wherein the Fe—Ni based alloy includes 2.5 mass % or more and 5.5 mass % or less of Si with respect to 100 mass % of a total amount of Fe, Ni, Si, M, and Cr.

* * * * *